Dec. 17, 1968   J. F. REUTELER   3,417,303
NUMERICAL CONTROL SYSTEM
Filed March 4, 1964   14 Sheets-Sheet 1

INVENTOR
Johann F. Reuteler
BY
Rockwell and DeLio
ATTORNEYS

| DECIMAL | BINARY | GRAY |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |

INVENTOR

Johann F. Reuteler

BY

Rockwell and De Lio
ATTORNEYS

Dec. 17, 1968    J. F. REUTELER    3,417,303
NUMERICAL CONTROL SYSTEM
Filed March 4, 1964    14 Sheets-Sheet 4
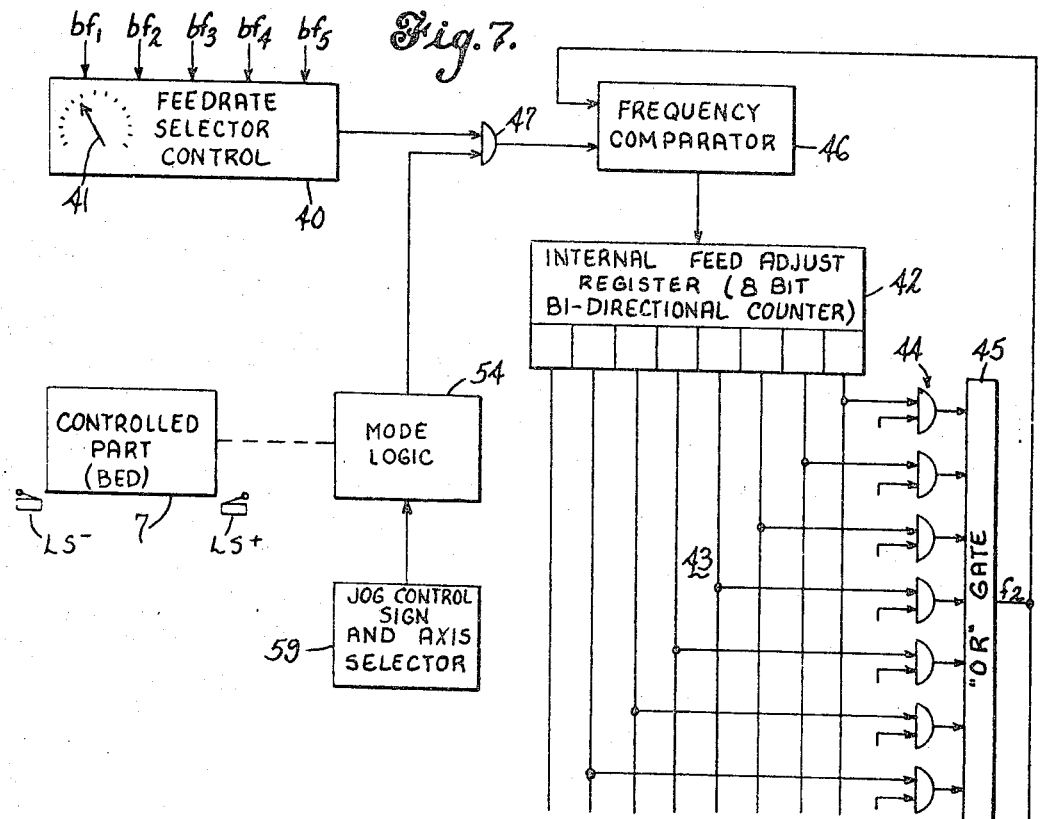
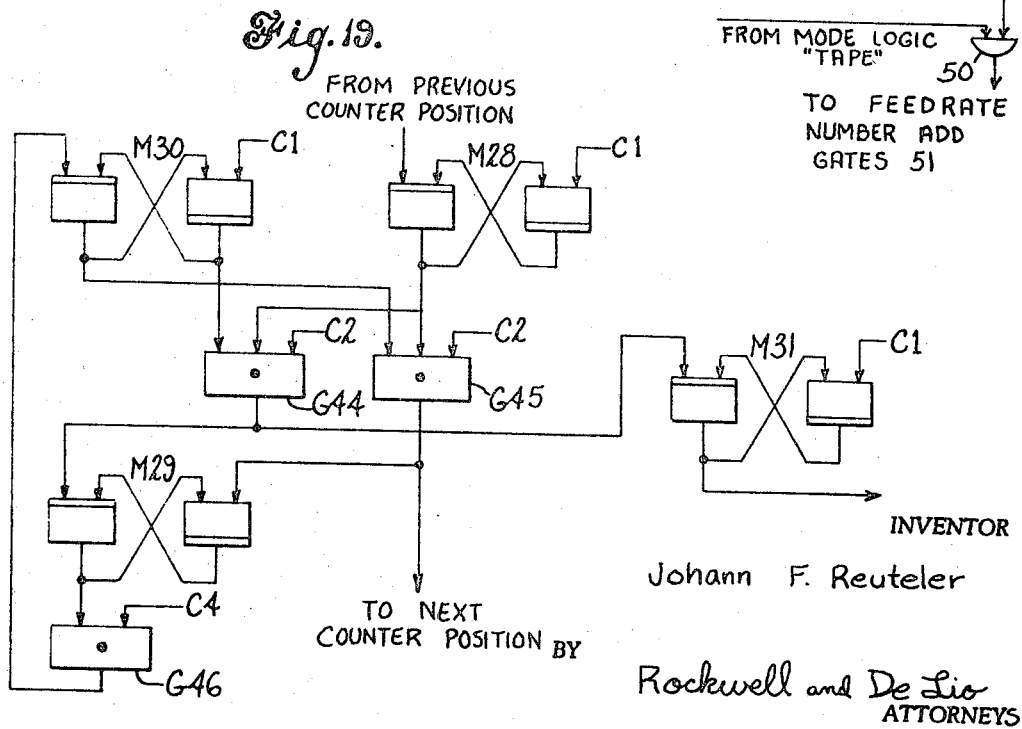
INVENTOR
Johann F. Reuteler
BY Rockwell and De Lio
ATTORNEYS

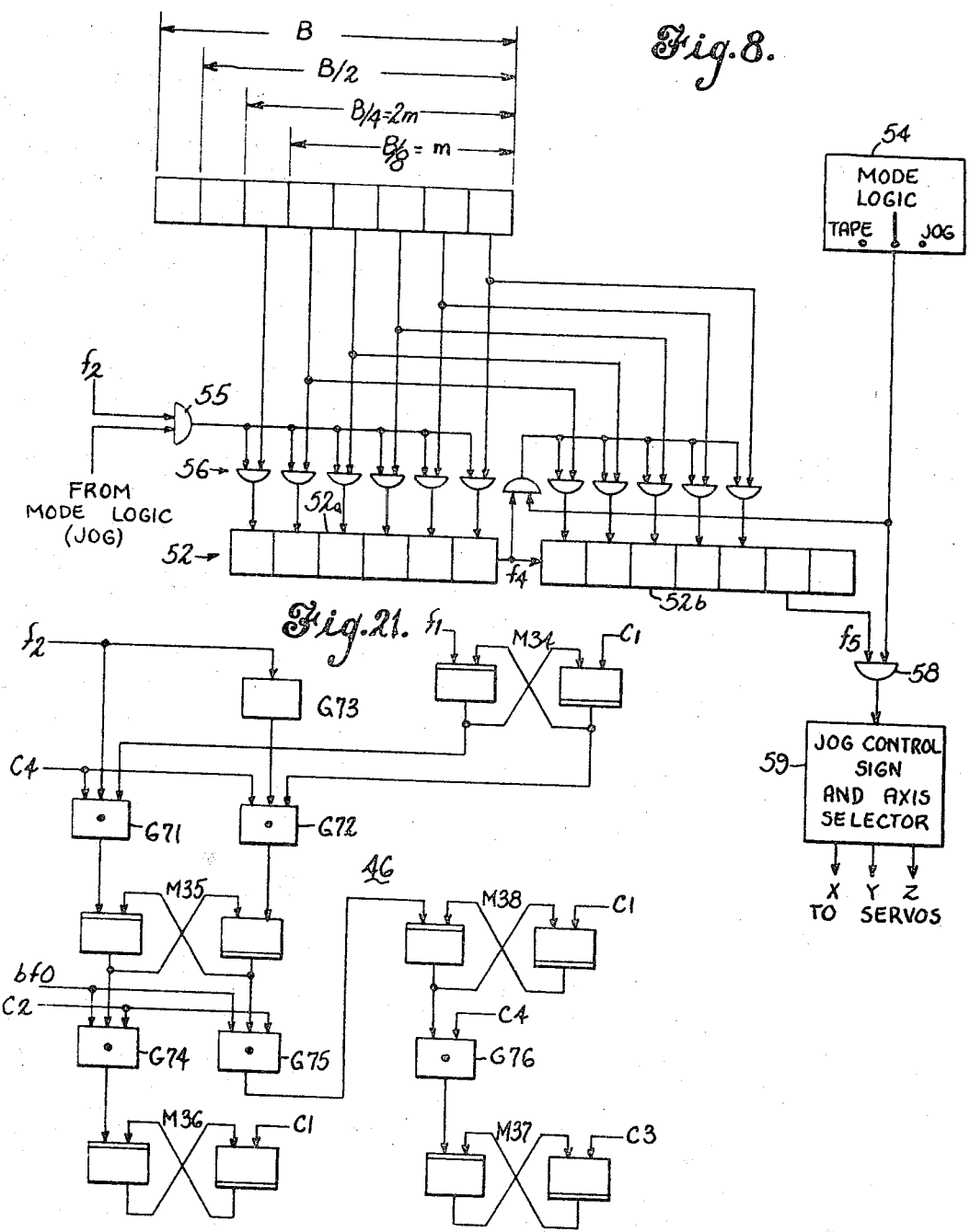

Dec. 17, 1968  J. F. REUTELER  3,417,303
NUMERICAL CONTROL SYSTEM
Filed March 4, 1964  14 Sheets-Sheet 6
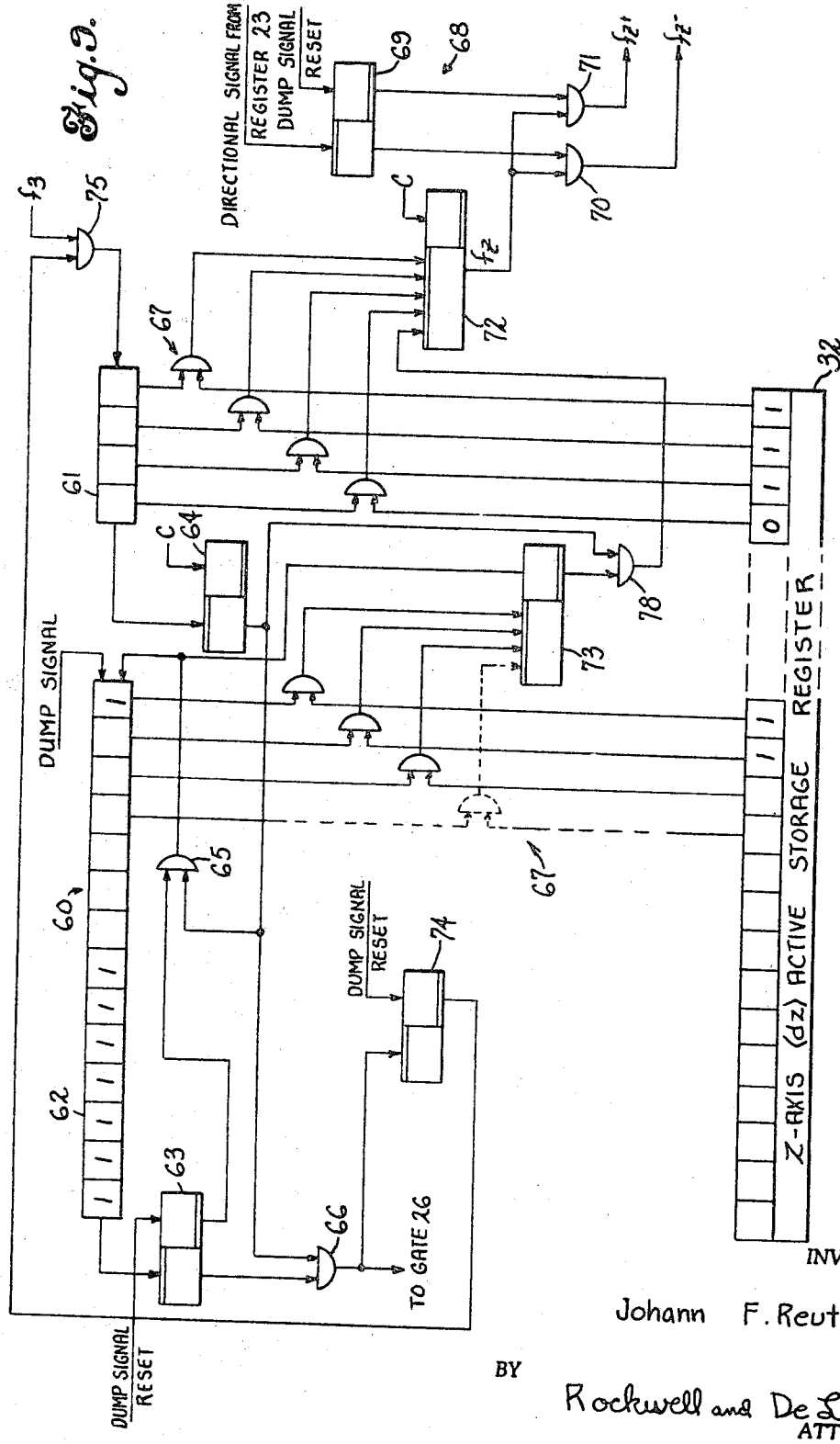
INVENTOR
Johann F. Reuteler
BY
Rockwell and DeLio
ATTORNEYS Dec. 17, 1968   J. F. REUTELER   3,417,303
NUMERICAL CONTROL SYSTEM
Filed March 4, 1964   14 Sheets-Sheet 7

INVENTOR
Johann F. Reuteler
BY
Rockwell and De Lio
ATTORNEYS

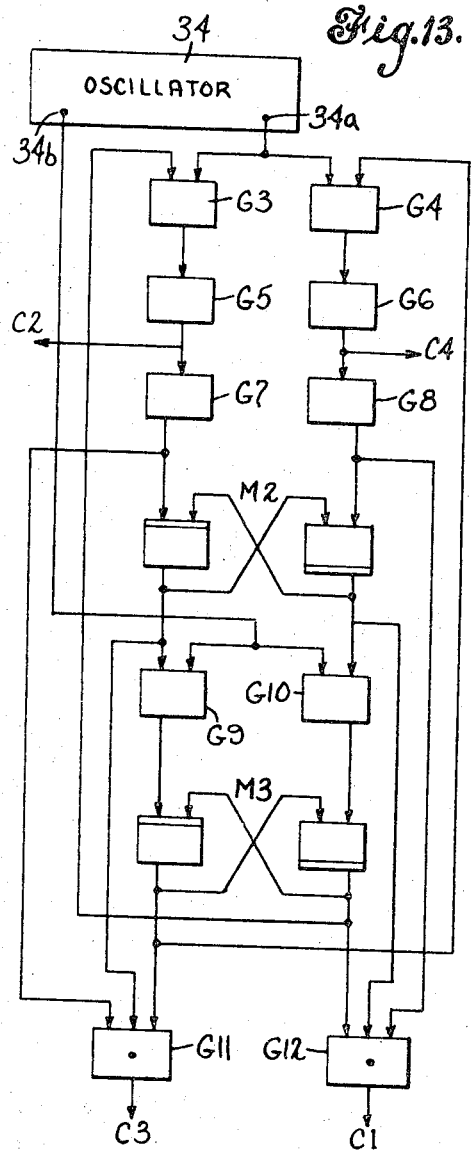
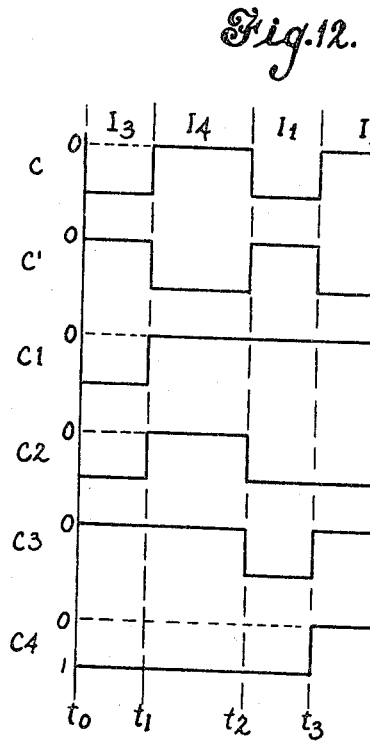
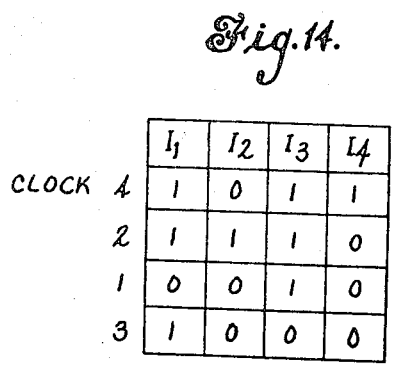

INVENTOR
Johann F. Reuteler
BY
Rockwell and DeLio
ATTORNEYS

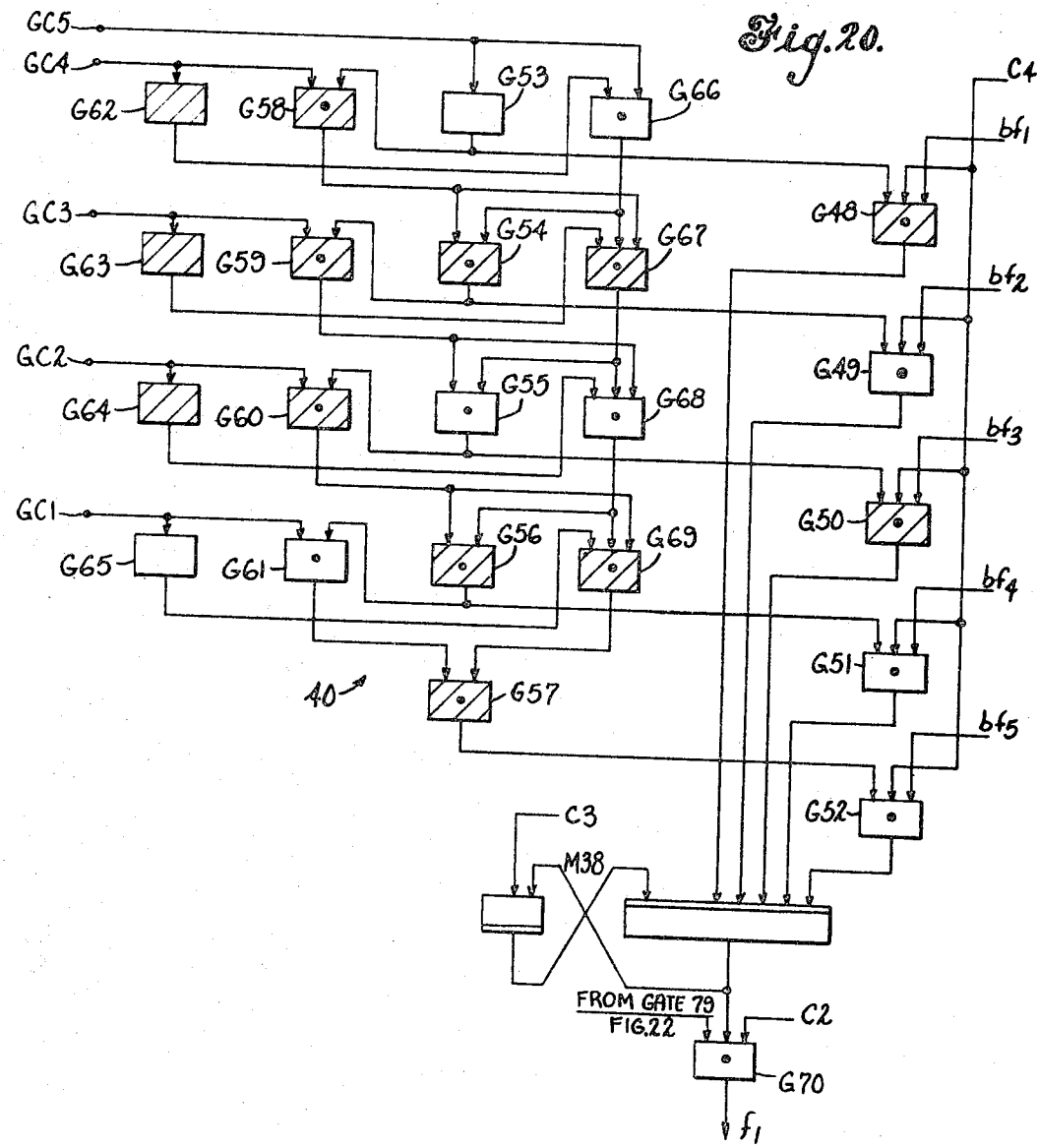

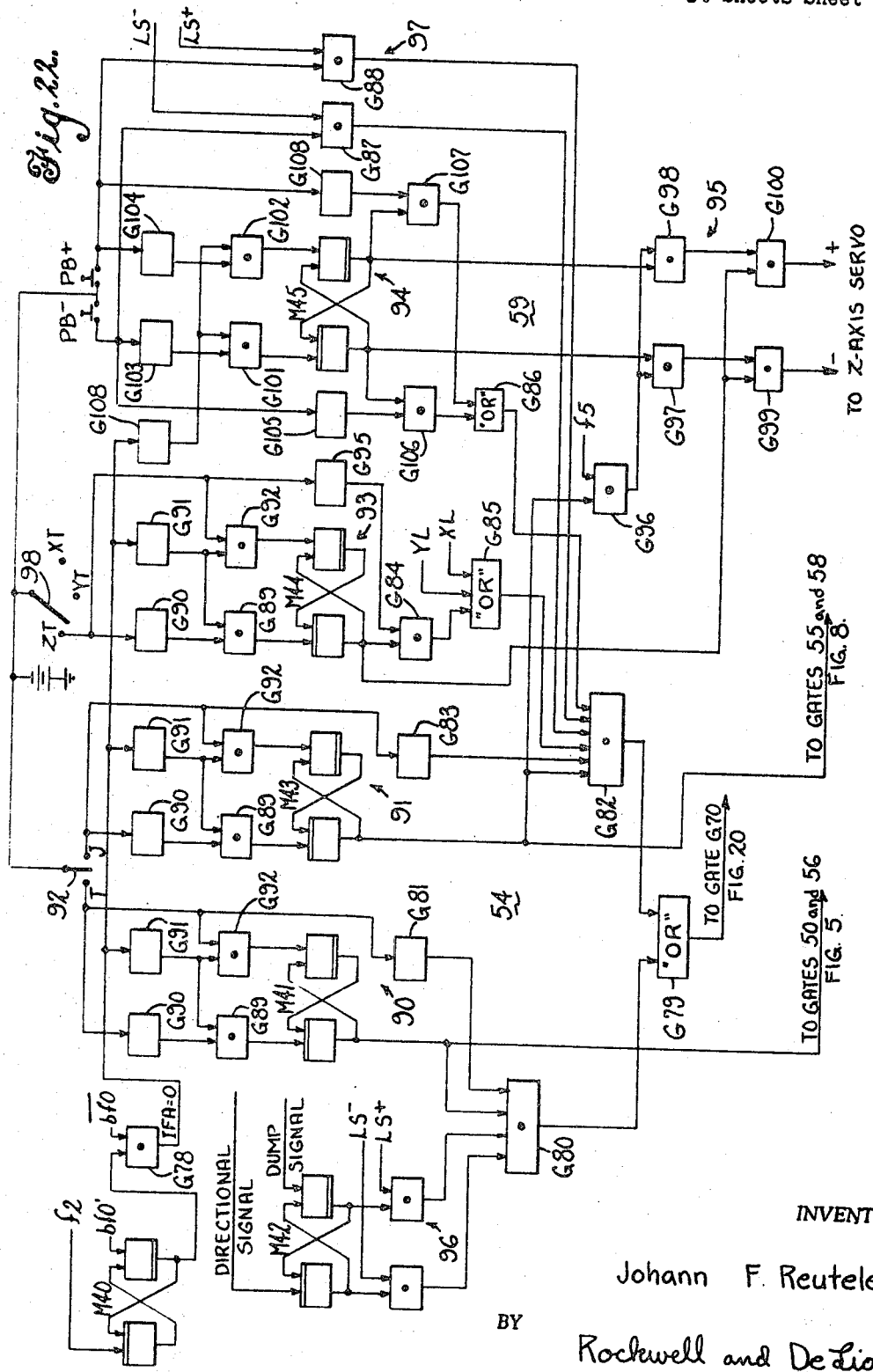

Dec. 17, 1968  J. F. REUTELER  3,417,303
NUMERICAL CONTROL SYSTEM
Filed March 4, 1964  14 Sheets-Sheet 14

Fig. 24.

INVENTOR
Johann F. Reuteler
BY
Rockwell and DeGio
ATTORNEYS

3,417,303
NUMERICAL CONTROL SYSTEM
Johann F. Reuteler, Elmwood, Conn., assignor to Pratt & Whitney, Inc., West Hartford, Conn.
Filed Mar. 4, 1964, Ser. No. 349,215
53 Claims. (Cl. 318—18)

ABSTRACT OF THE DISCLOSURE

This disclosure relates to a numerical control system for moving an object along a predetermined path. An interpolation system including a command counter is provided to gate command pulses to various servo systems, which is preset in the most significant bits in accordance with the longest distance instruction so that the command counter overflows when feedrate pulses applied thereto are summed in a magnitude of substantially the same binary length as the longest distance command to inhibit further interpolation and reduce interpolation time between successive instructions. Also disclosed is an acceleration control which generates pulses as a third order function of the setting of a selection means to prevent undue acceleration forces on the controlled parts. Further disclosed is a feedrate control in which feedrate pulses are generated at a rate proportional to a programmed feedrate number and a generated feedrate override pulse train. The feedrate number is multiplied at a rate determined by the override frequency. The result of this multiplication provides the feedrate pulses. Further provided are means for limiting the rate of change of the feedrate pulses to avoid undesired acceleration stress. Further disclosed are controls for manually selecting different objects for movement along an axis, the direction thereof, and automatic limiting of movement thereof during jog control.

---

This invention relates to control systems for moving an object along a predetermined path and more particularly relates to a new and improved system for controlling the path of movement of an object in accordance with information supplied to the system in numerical form.

A control system embodying the invention is one that is generally referred to as a continuous path or contouring numerical control system. Such systems, which are known to the prior art, generally comprise an input section arranged to receive information, in numerical form from a medium, which information indicates commanded distances and rate of movements of one or more objects with respect to non-coincident reference paths; a command generation section which converts the input information into pulse commands indicative of the distance and rate of movement of the object(s) with respect to the reference paths, and a plurality of servo-systems, each of which, in response to one of the generated commands, moves the object(s) with respect to one reference path a distance and at a rate determined by the command received by the input section. In numerical contouring controls, a continuous path, other than a linear path, is defined by successive linear increments which essentially define the desired path. For example, a circle would be defined by a multiplicity of chords.

Control systems of the type described generally include means for generating a pulse frequency at a repetition rate proportional to the desired rate of movement of the controlled object. The pulses are then delivered to one or more servo systems as command pulses in a quantity indicative of the extent of movement of an object with respect to a reference path and the rate of delivery indicates the desired rate of movement of the object to be moved. Each generated command pulse is representative of the increment of movement. The command pulses are usually generated at the desired rate and the number utilized depends upon the desired distance of movement of the controlled member with respect to a given reference path. In such case it is quite important that only the desired number of command pulses be applied to the servo systems.

The present invention relates to a control system of the type generally described above and provides new and improved features, hereinafter set forth. While the invention has many applications, it is particularly useful in controlling the relative movements of a workpiece and a cutting tool in a milling machine and will therefore be disclosed in such an environment.

In numerical control systems for machine tools, when a quantity of information is fed into the system, such information includes a feedrate command which determines the rate of generation of command pulses and hence the workrate of the tool and workpiece for the particular movement commanded. However, the feedrate at the time of programming often does not contemplate existing operating condition such as sharpness of the cutting tool, workpiece hardness, etc. Therefore, for efficient operation, the machine operator should be able to override or vary the programmed feedrate to meet existing operating conditions.

This invention provides new and improved means for manually selecting a feedrate and overriding the programmed feedrate. This is accomplished by generating a first train of pulses at a frequency selected by the operator and modifying this first train of pulses with the programmed feedrate number. The invention also provides new and improved means operative in conjunction with the feedrate override control means for limiting the rate of change of the first pulse repetition rate and hence the velocity of the controlled members to thereby avoid undue dynamic stresses on the controlled machine parts when the feedrate is changed.

The invention additionally provides new and improved means for controlling the velocity of a controlled part during manual or jog control. In a control system for a machine tool as described, efficiency of utilization demands that the controlled machine parts be capable of being moved under manual control as fast as the drives are capable, and also sufficiently slow to enable the operator to stop movement after a desired distance. The number of selectable speeds for manual control should be sufficient to give the operator a reasonable range of speed control. The difference or velocity steps between selected speeds should in all cases be such that no excessive or undue shock is improved on a part when changing from one velocity to another. The present invention provides a new and improved means for producing jog pulse frequencies, such that the velocities available therefrom are conveniently distributed over a wide range. These pulse frequencies and hence the velocities are spaced with relation to each other so that the ratio between any two consecutive velocity steps decreases as the velocity magnitude increases.

The invention further provides new and improved means for generating command pulses for moving an object a distance determined by a number of pulses wherein the pulse generating means is so arranged that it is operative to generate command pulses only for a time predetermined by the longest distance command. This arrangement allows only a desired number of command pulses to be generated and minimizes the possibility of introducing error into the system by utilization of more command pulses than desired. More specifically, the invention provides counting means for summing the number of potential command pulses received from pulse generating means and producing a plurality of binary related pulse frequencies determined by the number of counted pulses. Means are provided to terminate operation of the counting means when the desired number of command pulses have been generated and thus prevent generation and possible utilization of undesired command pulses.

An object of this invention is to provide a new and improved numerical control system.

Another object of this invention is to provide a numerical contouring control system having new and improved means for generating electrical representations in the form of a pulse frequency indicative of a machine workrate.

Another object of this invention is to provide a numerical contouring control system having new and improved means for manually overriding a programmed machine workrate and selecting a desired workrate.

Another object of this invention is to provide a numerical control system having means for overriding a programmed machine workrate including new and improved means for limiting the rate of change of the workrate to avoid the application of any undue dynamic stresses on the machine parts.

Another object of this invention is to provide a numerical control system having new and improved means for manual or jog control.

Another object of this invention is to provide a numerical control system having new and improved means for selecting a large number of machine speeds under manual control where the speed or velocity steps between selected speeds are such that no excessive shock is imposed on the machine parts when changing from one velocity step to another.

Another object of this invention is to provide a numerical control system having new and improved means for producing jog pulse frequencies, representative of a machine speed, such that the frequencies are conveniently distributed over a wide range.

A further object of this invention is to provide a numerical control system having means for generating potential command pulses including new and improved means for terminating generation of the pulses when a number predetermined by the length of the longest distance command has been generated.

A further object of this invention is to provide a control system of the type described including new and improved means for predetermining the number of command pulses to be generated in accordance with the length of the longest distance command.

A still further object of this invention is to provide a control system of the type described having means for predetermining the number of command pulses to be generated in accordance with the length of the longest distance command including new and improved means for sensing programmed feedrate instructions and distance commands which are incompatible to generation of the desired number of command pulses and in response thereto modifying the number of command pulses generated and utilizing only those generated above a predetermined number to thereby insure that the machine workrate is compatible with the distance a controlled member is required to move.

Other objects of the invention will in part be obvious and will in part be apparent from the detailed description.

The novel features of the invention are pointed out with particularity and distinctly claimed in the concluding portion of this specification. However, the invention, both as to organization and operation, together with further objects and advantages thereof may best be appreciated by reference to the following detailed description, taken in conjunction with the drawings, in which:

FIG. 7 is a logical diagram, partly in block form, of a portion of the interpolation illustrating the manner in which a pulse frequency indicative of a machine workrate is generated;

FIG. 8 is a logical diagram, partly schematic and partly in block form, illustrative of the manner in which jog control pulse frequencies are generated;

FIG. 9 is a diagram, partly schematic and partly in block form, illustrating the manner in which a pulse frequency indicative of a desired workrate is utilized to produce a train of command pulses where each pulse represents an incremental distance of travel of a controlled part with respect to a reference axis;

Figure 2:
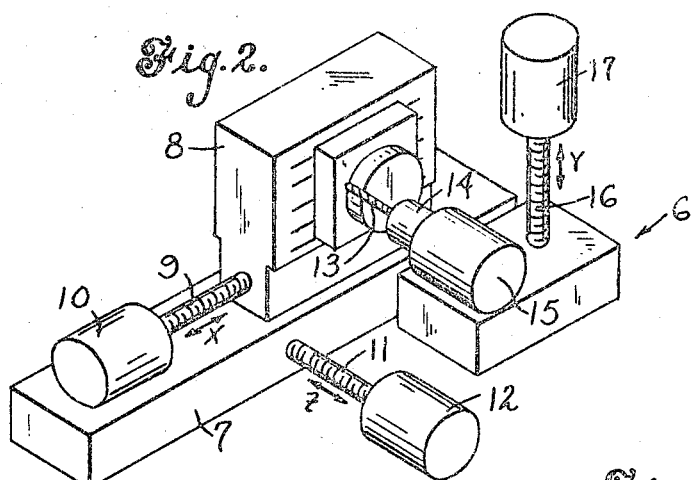
FIG. 2 is a representative view, in perspective, of the movable members of a milling machine which may be controlled by a system embodying the invention.
Figure 3:
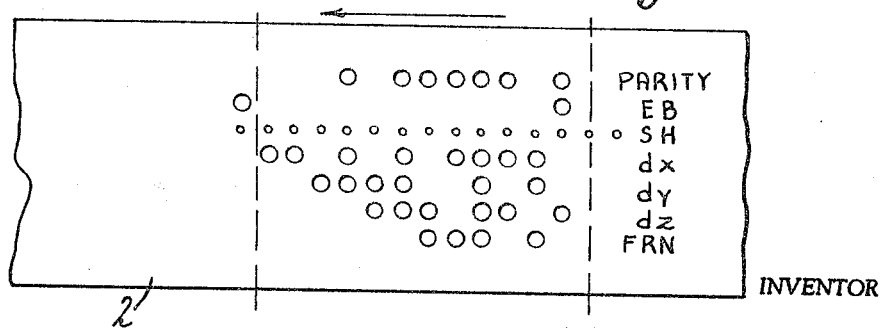
FIG. 3 is a view of a portion of an input information medium which may be used in conjunction with a system embodying the invention, which portion represents one increment of relative movement of two movable members.
Figure 4:
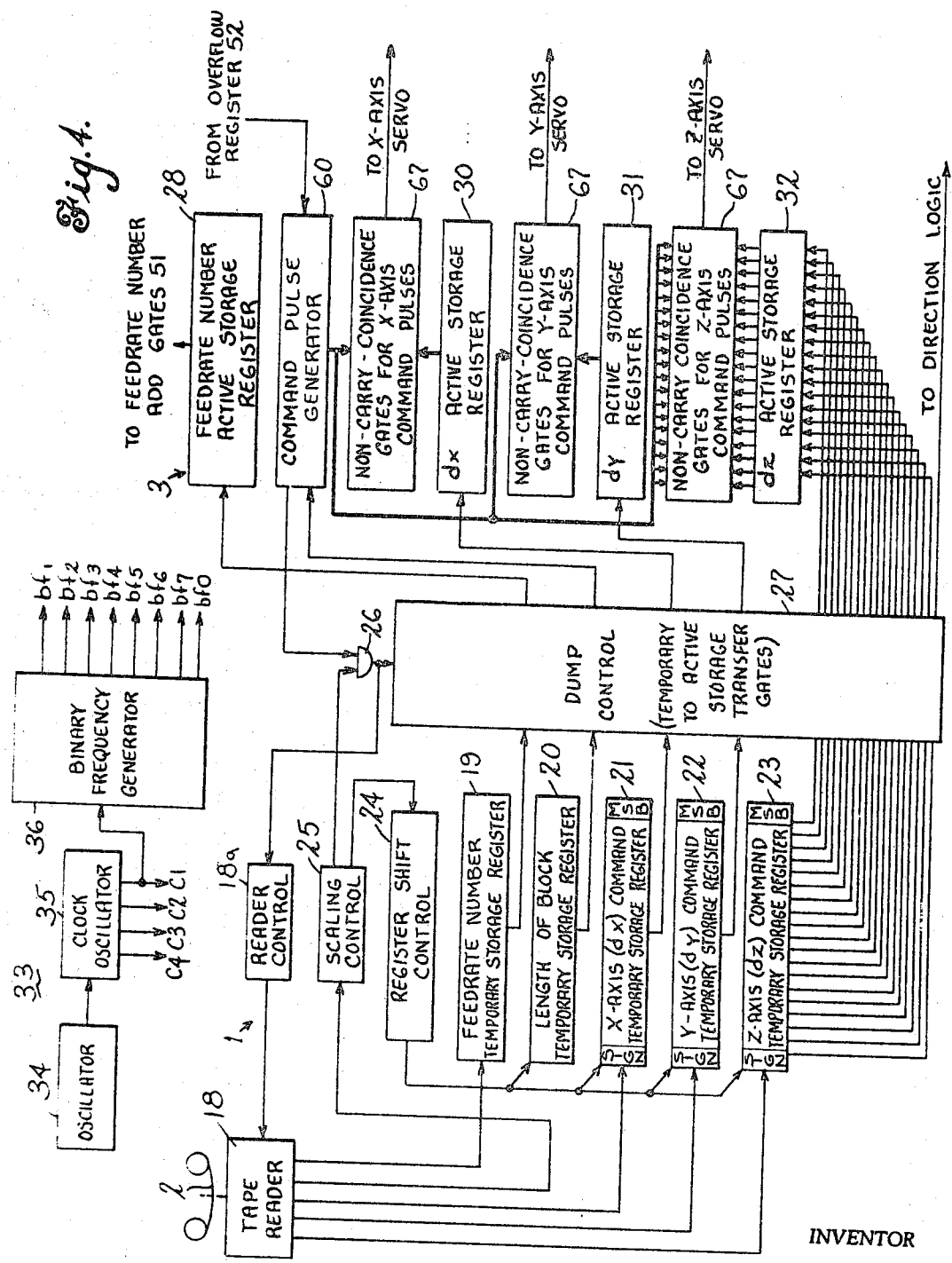
FIG. 4 is a diagram illustrative, in functional block form, of the input and temporary storage section of FIG. 1 and a portion of the interpolation and command generation section thereof.
Figure 10A:
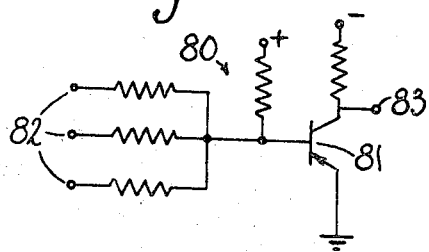
Figure 10B:
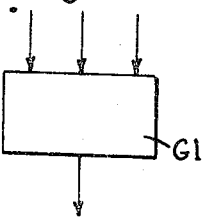
Figure 10C:
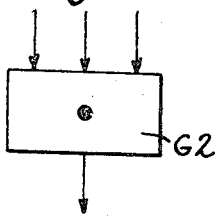
Figure 11A:
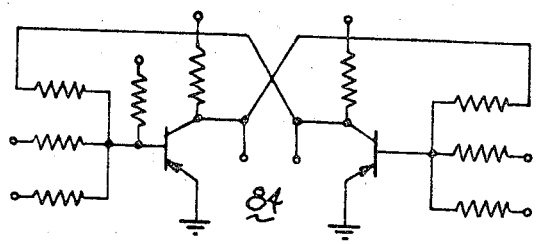
Figure 11B:
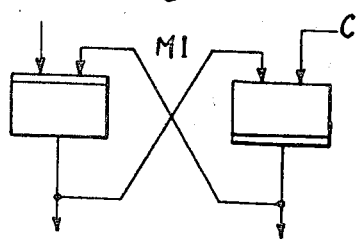
Figure 15:
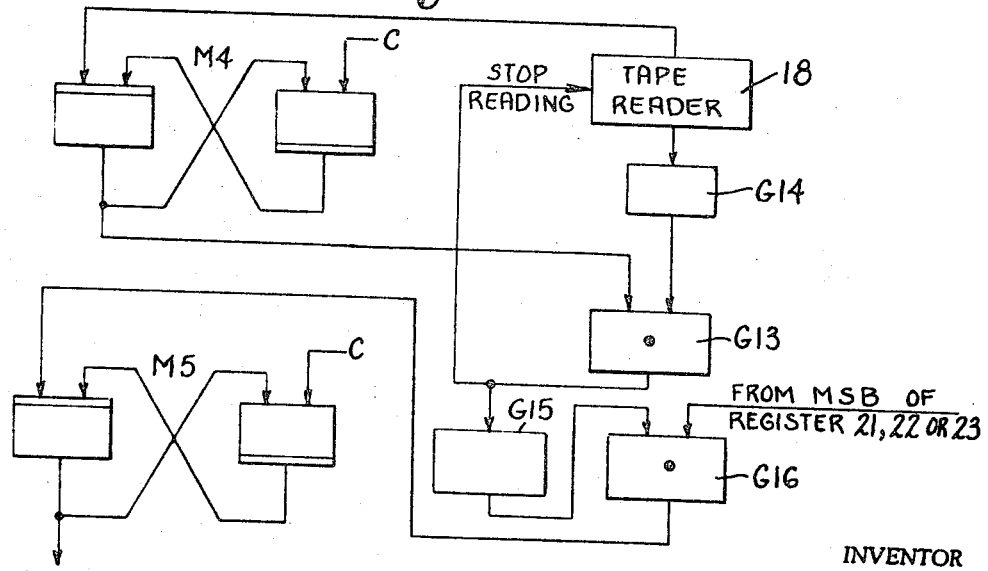
Figure 16:
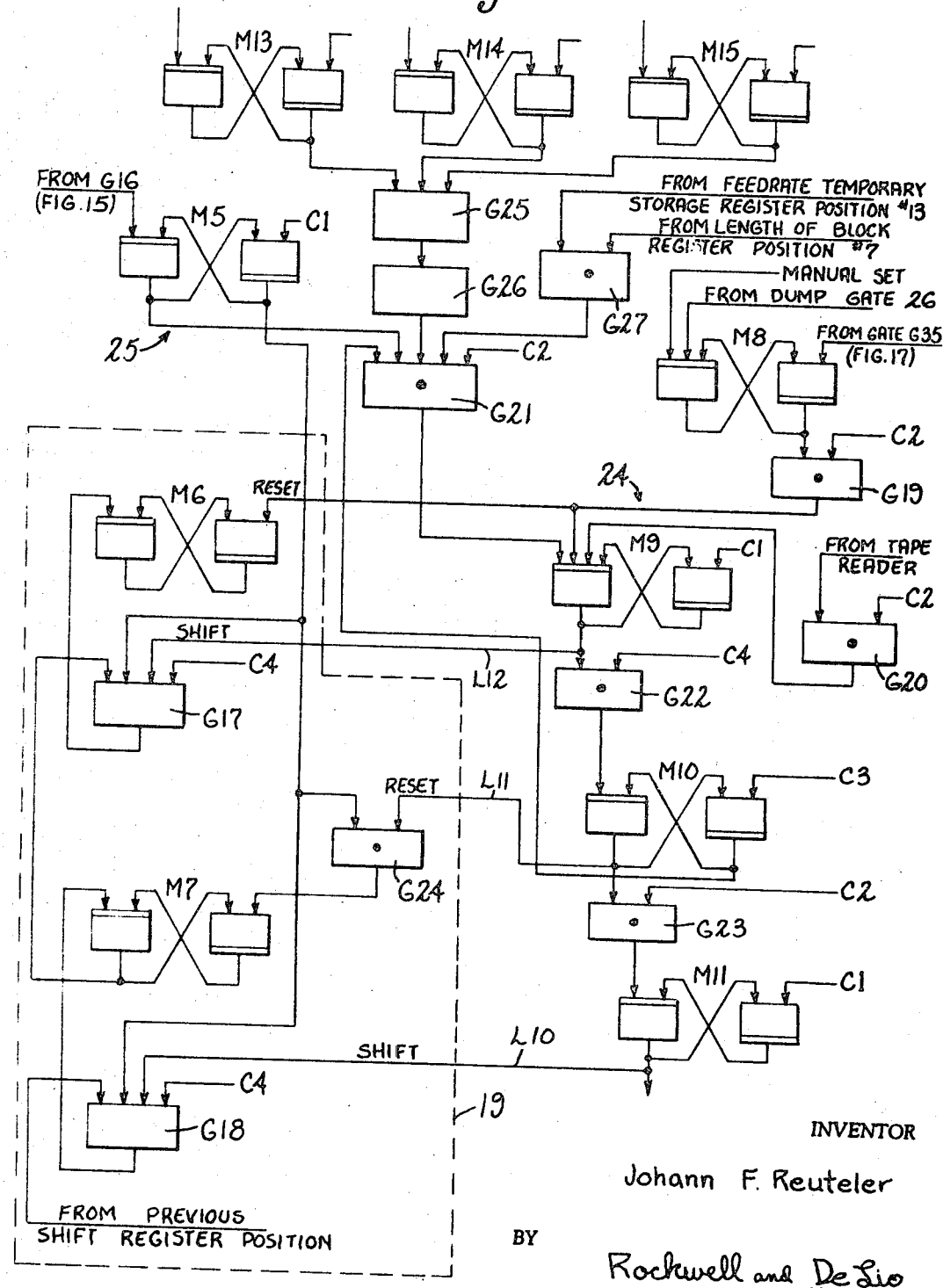
Figure 17:
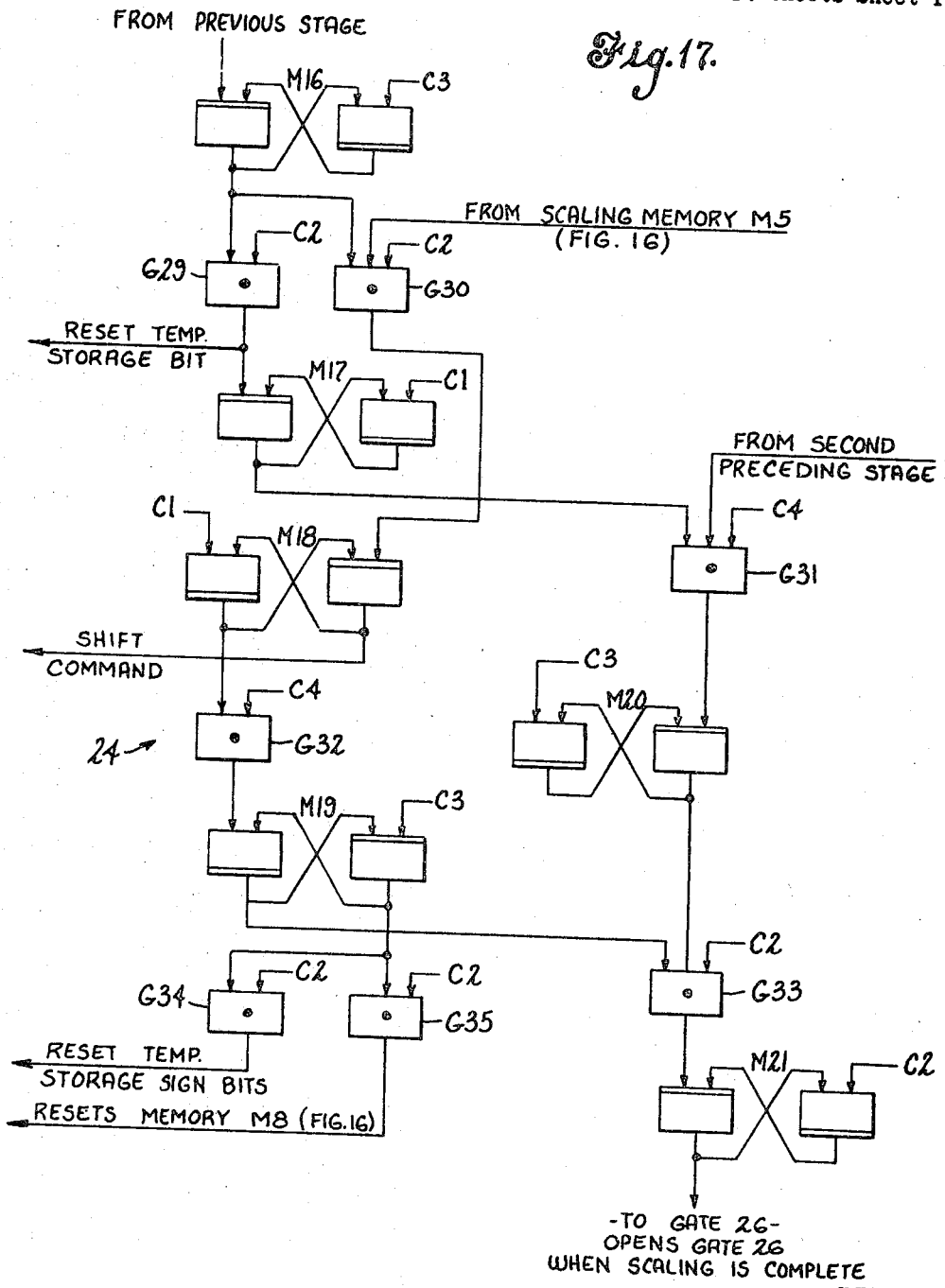
Figure 18:
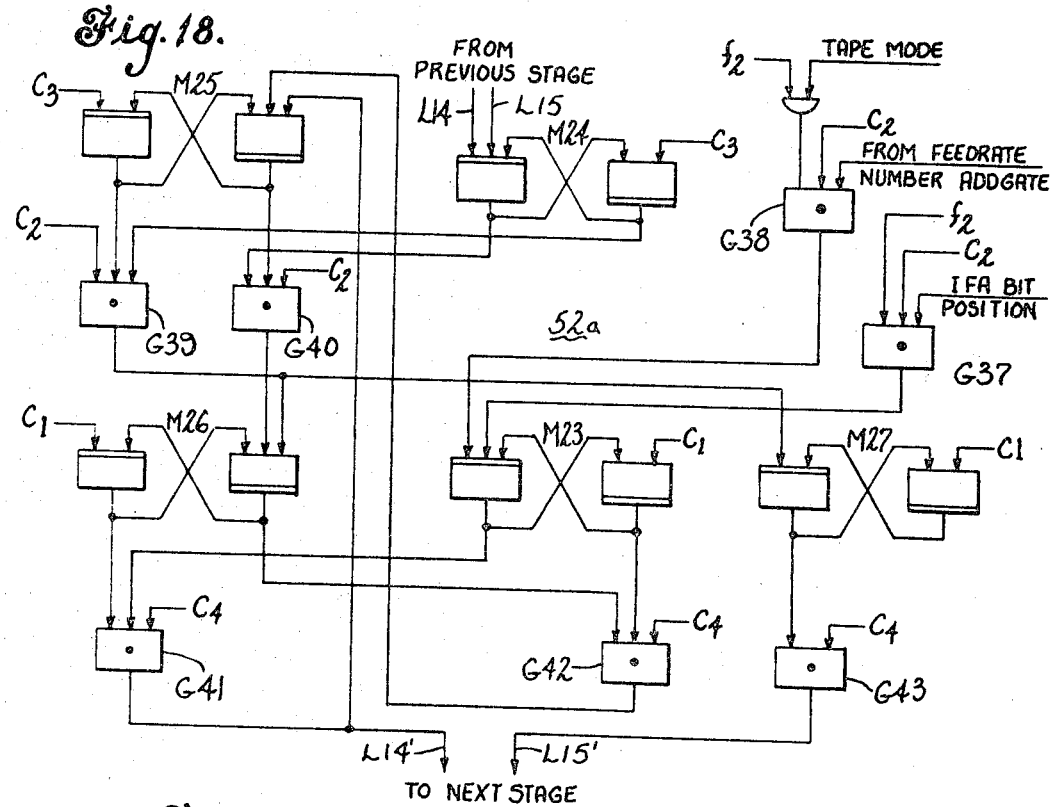
Figure 23:
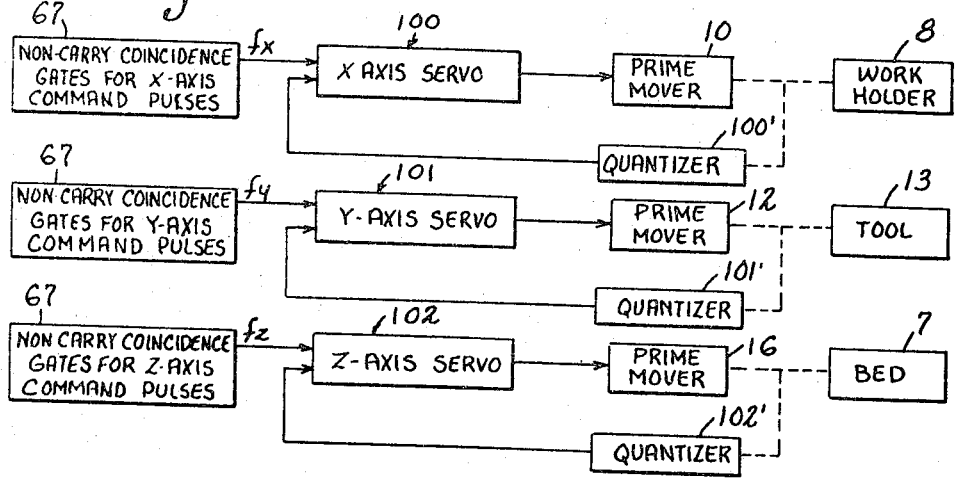

FIGS. 10a, 10b, and 10c are diagrams illustrative of a logical circuit element which may be used in components comprising a system embodying the invention;

FIGS. 11a and 11b are views ilustrative of a bi-stable device utilized in various components comprising a system embodying the invention;

FIG. 12 is a diagram of clock pulse wave forms utilized in the disclosed system;

FIG. 13 is a diagram of a preferred sequential switching circuit (clock oscillator) which will generate the wave forms of FIG. 12;

FIG. 14 is a table showing the relative voltage values of the wave forms of FIG. 12 at successive intervals of time;

FIG. 15 is a schematic diagram showing the manner in which a cycle of operation of the system is initiated and halted;

FIG. 16 is a logical schematic diagram of the temporary register shift control and scaling control shown in block form in FIG. 4;

FIG. 17 is a continuation of FIG. 16 and a further logical schematic diagram of a position of the shift control, shown in block form in FIG. 4, for the temporary storage registers of FIG. 3;

FIG. 18 is a schematic diagram of a position of a parallel adder utilized in a system emboding the invention;

FIG. 19 is a schematic diagram of a position of a binary counter including means for detecting non-carry pulses;

FIG. 20 is a schemtic diagram of a network for converting a Gray coded number to binary form;

FIG. 21 is a schematic diagram of a pulse frequency comparator shown in block form in FIG. 7;

FIG. 22 is a schematic diagram of a logic network which determines the mode of operation of the disclosed systems and further controls operation of the controlled members under jog or manual control;

FIG. 23 is a diagram in block form of the overall system servos arranged to control relative movement of the machine members of FIG. 2; and FIG. 24 is a diagram in block form of a preferred digital servo system.

GENERAL ARRANGEMENT

To disclose a preferred embodiment of the invention, a continuous path control system embodying the invention will be generally described, first in a general and functional system form. Upon a general description of the system and its illustration in block form, specific examples of components comprising or used in the disclosed embodiment of the invention will be described to further facilitate an understanding of the invention, or to illustrate exemplary embodiments and applications thereof.

The invention will be disclosed in an embodiment which controls three relative degrees of motion of the controlled members of a milling machine. Where components of the system are identical for each degree or axis of motion, only one will be described in detail.

Figure 1:
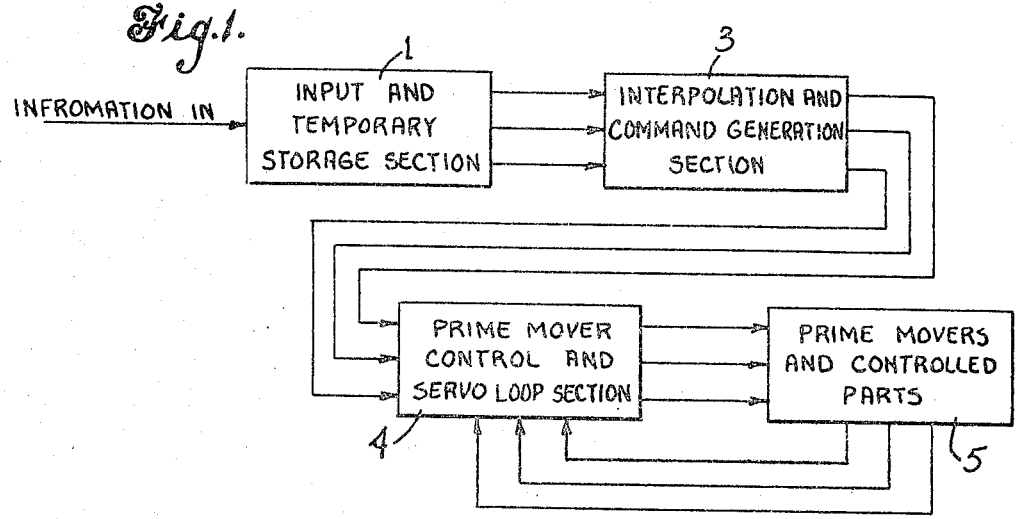
FIG. 1 is a block diagram, set forth for orientation, showing the general arrangement of a three axes continuous path control system which may embody the invention.

FIG. 1 illustrates in a very general manner a system embodying the invention. As shown in FIG. 1 information is fed into an input and temporary storage section 1. The information fed into section 1 may be stored on any suitable medium such as magnetic tape or punched tape. In the disclosed embodiment of the invention the information to be fed into the system is shown as stored in blocks on a continuous tape, which blocks are perforated in predetermined patterns indicative of the desired movement, direction of movement and programmed rate of movement of the controlled parts. A typical section of punched tape 2 is shown in FIG. 3 and will hereinafter be discussed in detail. A block of information on tape 2 is read into input and temporary storage section 1 until such time as a command is received to transfer the temporarily stored information into interpolation and command generation section 3. The interpolation and command generation section converts the input information into commands, in the form of electrical pulses, and transmits these commands to a prime mover control and servo loop section 4.

The prime mover control and servo loop section 4 processes the commands from section 3 and supplies the processed commands to the prime movers in the form of pulse frequencies which determine the magnitude, direction, and rate of movement of the controlled members with respect to the several axes of movement. Section 4 also includes feedback means in the form of pulse frequencies which are indicative of movement of the controlled part. The command pulses and feedback pulses are compared in section 4 and such comparison produces an error signal which controls the operation of the prime movers and movement of the controlled part as represented by the block 5.

The system as thus far described will be recognized by those skilled in the art as a classic or basic control system embodying servo loop principles.

As illustrated in FIG. 2, the movements controlled are the relative motions of a first member, the cutting tool of a milling machine, generally indicated at 6, relative to a second member, a workpiece along non-coincident reference paths or axes. In the machine illustrated, a carriage or bed 7 of the machine movable along a reference axis has a workpiece holder 8 mounted thereon movable along a second non-coincident reference path. Bed 7 is movable in the Z-axis by a lead screw 11 driven by a prime mover 12. Holder 8 is movable in the X-axis by a lead screw 9 driven by prime mover 10. A cutting tool 13 is mounted on a spindle 14 driven by a spindle drive motor 15. Spindle 14 is moved along the Y-axis by a lead screw 16 driven by a prime mover 17.

DATA INPUT

In a preferred form of the invention the data input to the control system is encoded in binary form on an essentially continuous strip of tape. The various commands are contained in binary form in successive columns on the tape. The various commands are feedrate number FRN which determines, at least in part, the workrate of the machine or part being controlled, delta X (*dx*) which determines movement of holder 8 with respect to the X-axis, delta Y (*dy*) which determines movement of cutting tool 13 with respect to the Y-axis, delta Z (*dz*) which determines movement of bed 7 with respect to the Z-axis, an end of block notation EB, and a checking or parity column.

The delta or movement commands are represented by a binary number or unit count, each unit of the count being equal to a predetermined increment of movement along that axis. If movement of the controlled part is .0002" per unit count the system will be considered to have a resolution of .0002" per increment. For further example, in the illustrated block on the tape in FIG. 3, the distance of movement of holder 8 with respect to the X-axis is represented by the binary number 11010101111, the commanded movement of cutting tool 13 with respect to the Y-axis is represented by the binary number 111100101, and the commanded movement of bed 7 with respect to the Z-axis is indicated by the binary number 1110110. As the various controlled members are moved in accordance with the distance or axes commands a predetermined relative movement of the cutting tool relative to the workpiece occurs. The last perforation or absence thereof in the *dx*, *dy*, and *dz* columns indicates the direction of movement; for example, the direction of movement in the X and Y directions will be positive as indicated by lack of a hole in the last space in that column, while the direction of movement in the Z-axis will be negative as determined by the presence of a perforation in the last space in the *dz* column. The number represented in binary form in the FRN column is the feedrate number FRN which primarily determines the rate at which command pulses are supplied to the axes servo systems, and consequently controls the rate of motion of the machine parts.

The channel designated EB contains the end of block indication, and is identified by the presence of a perforation at the end of that column. This code appears in the same row as that which contains algebraic signs of *dx*, *dy* and *dz*. The EB code provides stops between commands so that one command can be distinguished from the next. It is to be understood that the blocks may be any predetermined length as needed and are made as long as the longest binary command of any of the delta or feedrate commands, within the capacity of the system as will hereinafter be made apparent. The tape also contains a line of sprocket holes (SH), each sprocket hole residing in a perforation row and adapted to be engaged by a sprocket wheel to advance the tape.

The channel indicated as parity serves as an odd or even check. This channel is punched or not punched in order to make the total number of holes across any line odd for checking purposes. No further discussion need be made of the use of the parity checks as it is well known to those skilled in the art.

INPUT AND TEMPORARY STORAGE SECTION GENERAL DESCRIPTION

The input and temporary storage section 1 is illustrated in block form in FIG. 4. The function of section 1 is to receive data from tape 2, hold such data in temporary storage, and upon command transmit the data to active storage registers, hereinafter described in conjunction with the interpolation and command generation section 3. As illustrated, section 1 comprises a tape reader 18 which successively reads transverse rows across a block on tape 2. Each bit of information on tape 2 is transmitted row by row to an appropriate shift register. The feedrate number FRN is applied bit by bit to the feedrate temporary storage register 19, the most significant bit (MSB) being applied first. FRN does not exceed thirteen positions as disclosed. Similarly, the *dx*, *dy* and *dz* position commands are applied bit by bit to *dx*, *dy* and *dz* temporary storage registers 21, 22, and 23, respectively, MSB first. It will be understood that the storage registers 19, 20, 21, 22 and 23 are conventional shift registers having a predetermined number of binary digit (bit) positions which for purposes of illustration will be considered to be nineteen, eighteen for the *dx*, *dy* and *dz* commands and an additional bit for the direction command or sign. As each transverse row on tape 2 is fed into the least significant position of the temporary storage registers the bits of information previously stored therein are then shifted to the next bit position toward the most significant bit position (MSB) under the control of a register shift control 24, more fully described hereinafter.

The initial action of temporary storage section 1 is to merely write a binary command as it appears on tape 2 in the appropriate registers, with the most significant bits appearing to the right of the binary numbers stored in the register, as illustrated. When scaling control 25 receives a signal EB from the tape indicating that reading of a block of tape has been completed the end of block notation initiates an operation referred to as scaling. The scaling operation and scaling control 25, more fully described hereinafter, continuously shifts each bit of the binary command in the axes command registers to the next succeeding higher order position until the most significant bit of the largest axis command binary number is in the most significant bit MSB position of its register, that is, the last bit position to the right of the register as viewed in FIG. 4.

When a block of tape has been read into the temporary storage registers there is no notation in length of block register at this time. When scaling commences successive positions in length of block register are set to a binary "1" condition for each shift so that when scaling is completed the length of block register contains a number of binary "1" notations representative of the magnitude or length of the longest movement command. This is also a representation of the length of the block of information read into the system. At the end of the scaling operation length of block register 20 will contain a number of binary "1" equal to the number of times the delta commands have been shifted. These "1's" are in the least significant positions of the length of block register. For reasons that will hereinafter be made apparent the feedrate number is not scaled.

The information in temporary storage section 1 is now in a form adapted to be used by the interpolation and command section of the system.

When the scaling operation is complete the information in the temporary storage registers may then be transferred into the interpolation and command generation section 3. A signal from scaling control 25, indicating that the scaling operation is complete, coinciding with a signal at a transfer or "dump" gate 26 from the interpolation section saying that its operations are complete will initiate operation of a dump control 27 which comprises a multiplicity of gates. The gates of dump control 27, not shown, transfer the binary numbers in each of registers 19, 21, 22 and 23 into corresponding active storage registers 28, 30, 31 and 32. This transfer is accomplished in parallel so that all bits of all the binary numbers in the temporary storage registers are simultaneously transferred. However, for simplicity and clarity of illustration only the transfer of the binary numbers stored in temporary storage register 23 to active storage register 32 is fully shown as being in parallel. The binary "1's" in length of block register are transferred to the most significant end of a pulse counter comprising in part a command pulse generator, hereinafter explained. Each of the active storage registers 28, 30, 31 and 32 comprise a plurality of bistable devices which are set in states representative of the information transferred thereto.

When gate 26 signals for transfer of the next block of information to the active storage registers it also applies a signal to a reader control 18a which causes tape reader to commence reading a new block of information into temporary storage section 1.

It is apparent that the direction commands are the last tape notations read into registers 21, 22 and 23. These notations are left in the least significant register bit position during scaling, indicated by SIGN in FIG. 4. These notations are not transferred to active storage registers as are the numerical position data, but are utilized as hereinafter explained to control the direction of movement of a part along a given axis. As exemplified in FIG. 4, the $dz$ SIGN is not applied to $dz$ active storage register 32.

The function of dump control 27 is to transfer input data from temporary storage into active storage. This transfer takes place when both the scaling of the current input command and the interpolation of the previous block of information have been completed. This transfer function is accomplished in two steps. Upon gate 26 sensing that scaling and interpolation are complete the bistable memory elements in active storage are reset. One half clock cycle later, the dump gates open to permit copying of the information in temporary storage into active storage.

INTERPOLATION AND COMMAND GENERATION SECTION GENERAL DESCRIPTION

The basic function of interpolation and command generation section 3 is to generate command pulses, where the number of command pulses are equal to the binary distance or axis commands.

The information in active storage registers 30, 31 and 32 is a numerical quantity, indicative of the magnitude of movement of one or more controlled members with respect to three noncoincident reference paths. However, to be a command, this quantity must be delivered within a certain unit of time to form a rate command which determines the velocity at which the controlled part(s) moves with respect to the coordinate axes. The binary numbers in the active storage registers must be converted to an actual quantity and this quantity delivered at a specific rate. The ultimate or actual commands to the servo systems which control movement of the controlled part with respect to a particular axis are given as pulse trains, that is, a specific number of pulses within a predetermined length of time. The repetition rate of these pulse trains determines the rate of movement of the controlled part(s) while the number of pulses in each train determines the magnitude of movement with respect to a particular axis.

In converting the binary represented quantity FRN in active storage register 28 to a rate, three basic systems are involved: a clock system 33, a feedrate override control 40 (FIG. 5), and the unscaled feedrate number FRN in active storage register 28.

Clock system

Clock system 33 generally comprises an oscillator 34 which feeds a second oscillator 35. Oscillator 35 is termed the clock oscillator and continuously furnishes a plurality of clock pulses $C_1$, $C_2$, $C_3$ and $C_4$ having uniform timed relation, as illustrated in FIG. 12. In a system constructed in accordance with the disclosed embodiment of the invention the clock frequency is 42,667 cycles per second. An exemplary clock oscillator is hereinafter described in conjunction with FIG. 13. One of the clock frequencies from clock oscillator 35 drives a binary frequency generator 36 having a plurality of pulse outputs of binarily related frequencies. The outputs of the binary frequency generator 36 are so arranged that no pulses appear simultaneously on any two of the output lines. As illustrated, binary frequency generator 36 has seven outputs $bf_1$–$bf_7$ having binarily related frequencies per clock cycle of $\frac{1}{2}$, $\frac{1}{4}$, $\frac{1}{8}$, $\frac{1}{16}$, $\frac{1}{32}$, $\frac{1}{64}$, and $\frac{1}{128}$. This non-coincident, binary frequency relationship is accomplished by providing a pulse counter having a logic means to detect whenever a bit changes from a "0" to a "1", that is, whenever a non-carry occurs. For example, a binary "1" appears every other time in the first position, every fourth time in the second position, and every eighth time in the third position, etc. The carrying of the binary bit from "0" to "1" occurs according to these frequencies, and every binary number has one and only one carried bit. The overflow pulse $bf0$ is used for gating purposes. A binary frequency generator is exemplified in FIG. 19, and hereinafter described.

Feedrate control

Figures 5, 6:
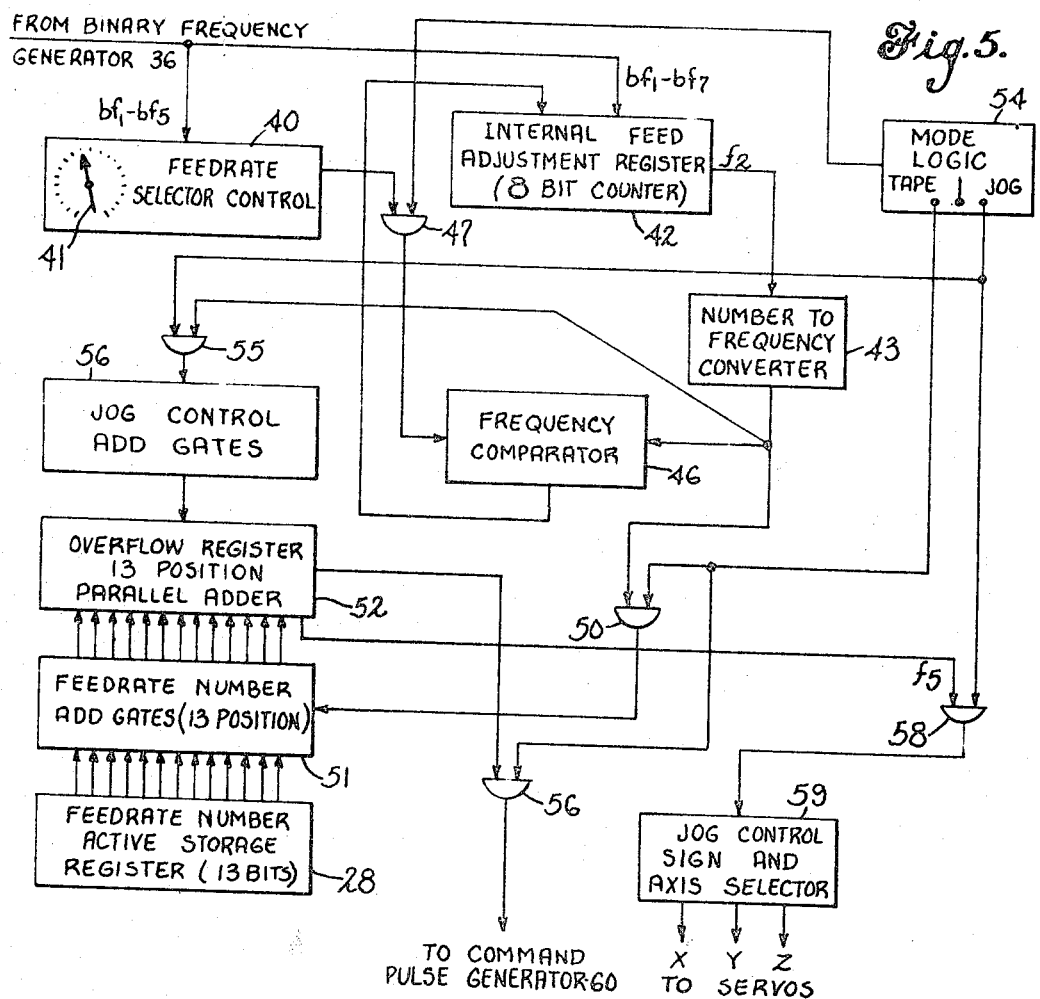
FIG. 5 is a view supplementary to FIG. 4 illustrating in functional block form the interpolation and command generation section of a system embodying the invention.
FIG. 6 is a table showing the corresponding notations of numerical information in Gray code and binary form.

The output of the binary frequency generator provides a time base which is subject to two additional controls, the feedrate number in active storage register 28, and the feedrate selector control 40 (FIG. 5). The feedrate control contains selection means which permit an operator to vary the machine workrate specified by feedrate number FRN by a factor from "0" to a predetermined percentage, for example, 124%.

Feedrate control 40 receives as an input five binary related frequency outputs of binary frequency generator 36, $bf_1$–$bf_5$ (FIG. 5). The purpose of the feedrate control is to allow the operator to vary the programmed feedrate in accordance with prevailing conditions, such as sharpness, hardness of workpiece, etc. Feedrate control 40 is operated by the selected position of a selector-switch 41 which may choose, for example, 0 to 124% of the programmed feedrate number in 4% increments. Selector switch 41 is a unit distance switch utilizing Gray coded binary numbers for each switch position, there being for example thirty-two switch positions. In this instance the Gray code is utilized because of its adaptiveness for indicating diverse switch positions without the possibility of ambiguity. FIG. 6 indicates the Gray code equivalent of decimal numbers up to twelve as compared to pure binary. Feedrate control 40 gates selected ones of frequencies $bf_1$–$bf_5$ in accordance with the position of selector switch 41 to provide a frequency proportional to the setting of selector switch 41.

The internal feed adjust register 42, which is an eight binary position bi-directional counter, holds a binary number corresponding to the setting of the feedrate control, except when there is a change taking place due to a change in position of selector switch 41. When there is a change taking place, the internal feed adjust register is either incremented or decremented once every 128 clock cycles (approximately 3 milliseconds) by the overflow pulse $bf0$ of generator 36 until the count therein agrees with the frequency $f_1$ being gated out of feedrate control 40. Register 42 holds a binary number indicative of the repetition rate of pulse frequency $f_1$.

The control of the increments and decrements in the bi-directional counter comprising the feed adjust register is to control the acceleration rate of the machine and smooth out any abrupt changes in speed which might otherwise appear by a change in the setting of selector switch 41 or interruption of $f_1$. The binary number held in the internal feed adjust register is utilized in a number-to-frequency converter 43 to gate selected ones of the binarily related frequencies $bf_1$–$bf_7$ through "and" gates indicated by the reference numeral 44 (FIG. 7). The outputs of the "and" gates 44 are applied to an "or" gate 45 and the output of "or" gate 45 is a pulse frequency, $f_2$. The pulse frequency $f_2$ and the pulse frequency $f_1$ from feedrate control 40 are applied to a frequency comparator 46 which increments or decrements register 42 in accordance with the algebraic sign of the difference between $f_1$ and $f_2$. The application of frequency $f_1$ to frequency comparator 46 is through an "and" gate 47 which is enabled by a mode logic element 54, more fully described hereinafter. In brief, mode logic 54 includes travel limit logic which allows $f_1$ pulses through gate 47 only when sign, mode, and axes memories agree with the position of selector switches as hereinafter described, and limit switches LS arranged to limit the extent of movement of the controlled part, exemplified by bed 7 (FIG. 7), are not tripped in the direction that the controlled part is attempting to move. As hereinafter more fully described the sign, mode and axes memories cannot change until the output of "or" gate 45 representing the binary number in register 42 is zero. When gate 47 is closed the internal feed adjust register will decrement to zero and thereafter allow the change in sign, mode or axes selection to be made. Gate 47 is then opened and the internal feed adjust register 42 is allowed to build up a count equal to the repetition rate of pulse frequency $f_1$. Thus any change in the pulse frequency $f_2$ is made at a rate determined by the previous rate of frequency $f_1$, or otherwise stated, by the previous position of selector switch 41.

When the system is operating in a tape mode, the output pulse frequency $f_2$ of "or" gate 45 is applied through an "and" gate 50 to feedrate number add gate 51 (FIG. 5) which is a thirteen unit parallel gate arranged to gate the feedrate number in active storage register 28 into overflow register 52 upon occurrence of each $f_2$ pulse. Overflow register 52 is a thirteen position unidirectional, parallel, full adder.

The function of feedrate number active storage register 28 is to hold the feedrate number during interpolation so that it may be introduced into the feedrate logic as hereinafter described. The feedrate number is introduced into active storage register 28 through gates in dump control 27.

The function of feedrate number add gate 51 is to repetitively add the feedrate number FRN to the number in register 52 at a rate proportional to frequency $f_2$ to produce overflow pulses at a rate that is proportional to the size of the feedrate number and the number of times that it is added.

From the foregoing it may be seen that frequency control 40 exemplifies a means for providing a pulse frequency $f_1$ proportional to a desired rate of movement of the controlled members, which means is exclusive of the feedrate number FRN. The internal feed adjust register 42 exemplifies a means for establishing a representation of frequency $f_1$, and number-to-frequency converter 43 is effective to generate a frequency $f_2$ proportional thereto. The internal feed adjust register 40 and frequency comparator 46 comprise a means for controlling the rate of change of pulse frequency $f_2$ when the position of selector switch 41 is changed.

The overflow frequency $f_3$ is developed when the system is to operate from instructions on the tape or as herein stated, in the tape mode. This condition is generally illustrated when the mode logic is set in a predetermined manner, as characterized by mode logic element 54 having a selection between TAPE and JOG. The $f_3$ pulses are then applied to a command pulse generator, hereinafter described, which supplies pulses to the axes servo systems in accordance with the binary axes distance commands stored in registers 30, 31 and 32, at a rate proportional to $f_3$. The $f_3$ pulses may be considered to be potential command pulses.

Jog control

The controlled members may also be moved manually or "jogged." In accordance with the invention, new and improved jog control means are provided which provide a wide range of jog speeds. In digital control systems for a machine tool of the contouring type, it is highly desirable that the controlled members be able to be moved under manual or jog control as fast as the drives are capable, and also sufficiently slow so as to enable the operator to stop after a desired increment of movement. It is quite important that the difference or velocity steps between selected jog speeds should in all cases be such that no excessive shock is imposed on the controlled parts involved.

If a geometrical progression is used in determining velocity steps, the steps between the higher speeds may very well exceed a permitted maximum value. For example, assume a digital control system of the type described has a maximum step between the lowest speed and the highest which is 2,000 increments per second and the number of selectable speeds is thirty-one (the number of selectable speeds on selector switch 41). The lowest selectable speed should be preferably no greater than two increments per second. In a geometrical progression of velocity steps, the range is thus 20,000/2 or 10,000. If a geometrical progression is to be used, the step ratio R would be $$R = (10,000)^{-(31-1)} = 1.36$$

The second highest speed would be the highest speed (20,0000 increments per second) divided by R, or approximately 14,700 increments per second. The step between these two speeds is approximately 5300 increments per second which is 265% of the desired maximum velocity step of 2,000 increments per second.

In accordance with the invention means are provided to achieve a wide range of jog speeds, yet not have any velocity steps between different speeds which would place undue stress on the controlled parts.

This is achieved by producing a jog pulse frequency which is a third order function of the position N of selector switch 41, by multiplying a basic frequency three times by this number. By choosing a suitable base frequency, the following speeds may be obtained:

| Selector position (N) | N³ | KN³ |
|---|---|---|
| 32−1=31 | 29,791 | 20,000 |
| 30 | 27,000 | 18,300 |
| 1 | 1 | .672 | where K=a frequency constant

This system covers a range higher than required, but the maximum velocity step is 1700 increments per second, well within the desired maximum.

In order to meet the aforementioned requirements, constants can be added to N in one or more cases before it is used to multiply the selected frequency. In one embodiment the function N³ is replaced by $$N' = n(n+\tfrac{1}{2})(n+1)$$

and the following values are obtained

| n | N' | K'N' |
|---|---|---|
| 31 | 31,248 | 20,344 |
| 30 | 28,365 | 18,647 |
| 2 | 15 | 9.7 |
| 1 | 3 | 1.95 | where K'=a frequency constant

One technique of obtaining a jog pulse frequency which is a third order function of the setting of the feedrate control selector is illustrated in FIG. 8.

It will be recalled that the output pulse frequency $f_2$ of the internal feedrate adjust register 42 (an eight position counter) is determined by setting of selector switch 41. Therefore $$f_2 = \frac{B}{2^8} f_c \quad (1)$$

where $f_c$=clock frequency, and B is the numerical representation in register 42. Frequency $f_2$ is passed by gate 55 when mode logic 54 (FIG. 5) is set for the jog mode of operation. For each $f_2$ pulse the number $2m$ (see FIG. 8) is added to a first section 52a of overflow register 52 through a series of parallel add gates 56. It will be recalled that overflow register 52 is a parallel adder. Section 52a then overflows at pulse rate $f_4$. Each time overflow of section 52a occurs the number $m$ is added to a second section 52b of register 52 together with the overflow. The overflow frequency $f_4$ is $$f_4 = \frac{(2m+1)f_2}{2^6} \quad (2)$$

Section 52b overflows at a rate $f_5$ where $$f_5 = \frac{(m+1)f_4}{2^6} \quad (3)$$

therefore by substitution of (1) and (2) in (3)

$$f_5 = \frac{m(m+1)(m+\tfrac{1}{2})f_c}{2^{16}} \quad (4)$$

from which it is apparent that the jog pulse frequency $f_5$ is a third degree function of $m$ which represents the setting of feedrate selector switch 41.

This arrangement gives a more convenient distribution of feedrates over a wide range and insures that the resulting velocity steps of the controlled members are within a desired limit. The velocity steps in increments per second are so spaced that the ratio between any two consecutive jog speeds decreases as the jog speed is increased.

It will be apparent that the number in feed adjust register 42, during jog operation, will still determine frequency $f_2$. Since $f_2$ determines the rate of subsequent events during jog operation, the rate of change of $f_2$ and hence the number in register 42 determines the acceleration or deceleration of the controlled members as a third order function.

The jog pulse frequency $f_5$ is selectively applied to the axes servos through a gate 58, enabled when the mode logic is properly set for jog, and an axes selector 59, more fully described hereinafter in conjunction with FIG. 22. One stage or position of overflow register 52 is described in more detail in conjunction with FIG. 18.

*Command pulse generator*

The command pulse generator 60 (FIGS. 4 and 9) receives the overflow pulse frequency $f_3$, sums the $f_3$ pulses until a predetermined sum has been counted and generates a series of command pulses at a rate proportional to the repetition rate of pulse frequency $f_3$. The command pulse generator changes the potential command pulses $f_3$ into actual command pulses which may be utilized to move the one or more controlled members an incremental distance for each command pulse applied to an associated servo. The command pulses are then utilized in accordance with the numerical movement instructions in each of the axis active storage registers to actuate the servos. The command pulse generator is a unidirectional counter having logic means associated with each binary digit position to detect non-carry pulses and thereby provide a plurality of binary related pulse frequencies which provide command pulses.

The command pulse generator, as exemplified, comprises an eighteen position unidirectional counter having a parallel counter portion 61 and a serial counter portion 62. The four least significant positions are arranged as a parallel counter and the fourteen most significant positions are arranged as a serial counter. The reason for this division of stages is hereinafter made apparent.

When the information in the temporary storage registers is transferred to active storage, the lowest weight length of block bit is transferred to the MSB of serial counter portion 62 and the remaining length of block bits are similarly transferred. Using the example previously given, binary "1's" would be transferred to the seven most significant positions of the counter indicating that the longest axes command ($dx$=11010101111) comprised eleven bits. The seven binary "1's" transferred to the serial portion represent the seven shifts which occurred during scaling to set the MSB of the $dx$ command in the MSB position of register 21. At the same time, the dump signal from gate 26 sets an increment in the first bit position of counter portion 66. This bit is added immediately to any number in the serial section and carries, if any, are immediately propagated down the counter. When serial portion 62 is filled to capacity, the next count will cause it to overflow and set a memory, in the form of a bi-stable device 63.

When parallel section 61 has counted sixteen $f_3$ pulses (assuming no number was set therein by the length of block register) it will overflow and set memory 64, which is reset each clock cycle. Each time parallel portion 61 overflows and sets memory 64, an increment is delivered to the first bit position of serial portion 62 through gate 65, which is open until inhibited by setting of memory 63. Each time gate 65 applies a pulse count to serial portion 60 it also resets memory 73. When both memory 63 and memory 64 are set, gate 66 senses that the counter has completely overflowed and a signal indicative of such condition is forwarded to dump control gate 26 stating that the active storage memories may be reset and the information in temporary storage then transferred to the interpolation section.

At this point it is apparent that the counter will overflow when it has summed a number of $f_3$ pulses predetermined by the length or magnitude of the longest axis command. This length or magnitude is initially represented by the number of shifts during scaling and the number of "1's" preset in the length of block register, and hence the number of "1's" transferred to the counter.

The counter is provided with means for generating a plurality (eighteen, as exemplified) of binary related pulse frequencies which have non-coincident pulses. This is accomplished by the provision of logic means to detect non-carry pulses as explained in conjunction with FIG. 19.

Selected ones of these pulse frequencies are applied to each axis servo, predetermined by the binary numbers in the axis command active storage registers through non-carry coincidence gates 67 for each axis. As exemplified in FIG. 9, non-carry coincidence gates 67 are selectively enabled by the presence of a binary "1" in an associated binary position of Z-axis active storage register 32. This gates a pulse frequency of corresponding weight from the command pulse generator. In FIG. 9 only eight of the non-carry coincidence gates 67 are shown, for simplicity of illustration. It will be understood, however, that each position of register 32 is arranged to gate non-carry pulses from a counter position providing a non-carry pulse frequency of like weight. The sum frequency $f_z$ from all the non-carry coincidence gates 67 are passed through OR logic, subsequently explained, to a directional logic circuit 68 for the Z-axis servo. This circuit comprises a memory 69 which is set by the directional sign at SIGN of register 23, FIG. 4. If memory 69 is set it indicates a negative direction of movement with respect to the Z-axis and $f_z$ pulses are gated to the negative direction input of the Z-axis servo through gate 70. If memory 69 is not set $f_z$ pulses are passed by gate 71 to the positive direction input of the Z-axis servo. Each pulse in the pulse train $f_z$ represents a discrete incremental movement of a controlled part or member with respect to the Z-axis.

In a manner similar to that explained for the operation of the Z-axis active storage register the X and Y axes active storage registers 30 and 31, respectively, are utilized to gate signals emanating from the command pulse generator having binary related frequencies to the X-axis and Y-axis servo systems.

It may be noted that the command pulse generator 60 in conjunction with the active storage registers and the "and" gates 67 comprise a number-to-frequency converter similar to number-to-frequency converter 43 discussed in conjunction with internal feed adjust register 42.

The four pulse trains from the parallel portion 61 which are selectively passed through associated gates 67 are utilized to set a bi-stable memory 72 which provides an "OR" function and transmits the selected pulse trains to directional gates 70 and 71. Memory 72 is reset each clock cycle. The pulse trains from the serial portion 62 which are passed through associated gates 67 set a bi-stable memory 73 and the resulting pulses are utilized to set memory 77. Memory 73 is reset, if set, when parallel counter portion 61 overflows, and applies a pulse to the left side of memory 72 through gate 78. All of the pulse trains passed by gates 67 contribute to the resultant command pulse frequency $f_z$.

In the arrangement described, the maximum possible interpolation rate is attained. The "1's" transferred to the counter from sections 62 and 61 length of block register 20 reduce the capacity of the counter in accordance with the length of the block of instructions fed into the system. This causes the counter portion of the command pulse generator to overflow and end the interpolation operation in accordance with the length of the longest axis command. No "dwell" time occurs as would be the case if it were necessary to wait for the counter to count $f_z$ pulses up to its maximum capacity before the cycle was completed, and the binary axes commands had a lesser number of binary digits than the positions of the counter.

The binary "1" introduced into the least significant bit of the serial counter portion by the dump signal serves a very important purpose. Assume that all positions of the serial portion are set to contain "1's" upon transfer of information to active storage. Then, upon overflow of the parallel portion, the serial portion of the counter would not overflow until the overflow pulse from the parallel portion had propagated down the serial portion. In the illustrated embodiment of the invention, this would require seven clock cycles (fourteen positions). During this time the parallel portion would continue counting $f_3$ pulses (up to one $f_3$ pulse per clock cycle) after the desired number of $f_z$ pulses had been generated, and therefore possibly introduce an error into the system. In the disclosed arrangement, under the condition assumed, the serial portion would overflow after seven clock cycles and set memory 63. Then upon overflow of parallel portion 61, memory 64 is set, gate 66 senses this condition and interpolation is halted. Thus no error is introduced into the pulse frequency $f_z$.

Means are provided to halt application of $f_3$ pulses to the command pulse generator when an interpolation cycle is complete. When gate 66 senses that both of sections 61 and 62 have overflowed it applies a setting signal to a memory 74, which upon setting thereof applies an inhibiting singal to a gate 75 which blocks application of $f_3$ pulses to the command pulse generator. Gate 75 is again enabled to pass $f_3$ pulses when memory 74 is reset by a dump signal and new information is transferred into the active storage registers and command pulse generator.

Under certain conditions, hereinafter explained, the application of $f_3$ pulses to the command pulse generator is interrupted to prevent or suspend further generation of $f_z$ pulses, during an interpolation cycle. One stage or position of the command pulse generator is illustrated in FIG. 19 and described in conjunction therewith.

TEMPORARY STORAGE AND INTERPOLATION CIRCUITRY AND LOGIC

Various details of the elements previously illustrated in block or logical form are now described, where appropriate, for a clearer understanding of the structure and operation of a system embodying the invention.

The invention may be embodied in a system using various circuit elements such as vacuum tubes, magnetic cores, transistors, etc. as switching elements and combinations thereof as bi-stable memory devices. Such switching elements and bi-stable devices may be constructed in various configurations, familiar to those skilled in the art, to provide various logic elements such as pulse counters, binary number adder, shift registers, etc. Such logic elements will be discussed in detail where it is deemed appropriate to facilitate a ready understanding of the relationship and cooperation between the various exemplified elements and sub-systems which comprise the disclosed embodiment of the invention.

In a preferred form of the invention the various components thereof utilize or are constructed from the well-known NOR circuit, illustrated schematically in FIG. 10a. NOR element or circuit 80, as illustrated, comprises a PNP transistor 81 in the grounded emitter configuration having a plurality of inputs 82 to the base. As will be apparent from FIG. 10a there will be an output voltage (negative) at the collector 83 of the transistor 81 whenever there is no negative input signal at any of the input lines to the base of transistor 81. If there should be a negative input to the base of transistor 61 the transistor will become conductive and the collector will then go to ground. When transistor 81 is cut off the collector will essentially be at the supply voltage. Therefore, when transistor 81 is in a conductive state this may be considered a "0" output and when it is cut off it may be considered to have a "1" output. In the circuits hereinafter explained the NOR circuit of FIG. 10a will be illustrated as shown by FIG. 10b which is designated gate G1. FIG. 10b illustrates the NOR element as it is used as an OR gate or merely for purposes of inversion. FIG. 10c illustrates the manner in which the NOR element will be illustrated as a coincidence gate to provide a "1" output when there are no input signals. It will be understood that in some instances a "0" input is considered an input signal.

The NOR elements may further be utilized to provide bi-stable memory devices 84 as illustrated in FIG. 11a. For simplicity of illustration the bi-stable flip-flop 84 of FIG. 11a is hereinafter illustrated as shown in FIG. 11b or as previously illustrated by memories 62, 63, 72, 73 and 74, FIG. 9, and such elements will be referred to as memories, the element of FIG. 11b being designated M1. The operation of these bi-stable devices is well known to those skilled in the art and no further mention of such operation need be made here. It will be understood, of course, that the particular circuit elements here shown are set forth only to disclose a preferred embodiment of the invention.

As shown in FIG. 11b the input designated by the letter C represents a clock pulse which may be applied to either side of the flip-flop for setting or resetting. In accordance with recognized nomenclature the flip-flop may in some instances be spoken of as having "true" and "false" outputs, a true output being a binary "1" state when the memory is set, and a binary "0" when reset. A false output is the opposite condition. As will be noted in FIG. 11b the left side of memory M1 will have a "1" or negative voltage level output when the right side has been reset by a clock pulse.

The construction and operation of networks such as shift registers, serial and parallel counters, adders, etc. are well known to those skilled in the art and need not be described per se in detail herein. A convenient reference disclosing such networks is Digital Computer Principles, Burroughs Corporation, 1962, published by McGraw-Hill Book Co., Inc. The technical operation of a bi-directional counter is explained in an article entitled, "The Binary Quantizer," Electrical Engineering, November 1949.

*Clock system*

The timing for all events that take place is determined by a clock oscillator which emits four clock signals, C1, C2, C3 and C4, which sequentially occur between "0" voltage level and a predetermined negative voltage level, hereinafter referred to as a "1" level. Each clock signal has the form of a short pulse followed by a long pulse of the opposite state as shown in FIG. 12. One clock cycle and its relation to the output signals of oscillator 34, and the four pulses comprising a clock cycle in a predetermined sequence are shown in FIG. 12, and further exemplified in FIG. 14 with respect to succeeding intervals of time $I_1$, $I_2$, $I_3$, and $I_4$. The clock pulses C1, C2, C3 and C4 shown in FIG. 12 are derived from the clock oscillator 35 of FIG. 13. The operation of clock oscillator 35 will now be described.

Oscillator 34 continually gives out two signals, C and C', FIG. 12, which are identical except that one is the inversion of the other. The operation is explained assuming initially that the output C of terminal 34a is a negative going pulse representative of a "1" condition at time $t_2$. At gates G3 and G4 this negative pulse is inverted to "0" and at G5 and G6 the output is "1" since there is a "0" input. The output of G7 and G8 are "0" since the inputs thereto are "1." The "0" output from G7 has no effect on the inputs to memory M2. However, assume that the left side of memory M2 is conducting. Then the output of the left side of M2 is "0," which together with the "0" input from gate G8 holds the right side of memory M2 off. Therefore, the output of the right side of M2 is "1."

As thus far described, the pulses from terminal 34b traveling down the right and left sides of the circuit have encountered identical stages and as thus far explained they will create conditions allowing continuous production of pulses for clock signals C2 and C4 taken from the outputs of G5 and G6, respectively. However, looking at the outputs of memory M2, the left side output is "0" and the right side output is "1." At this time, $I_1$, a "0" C' pulse from terminal 34a is occurring and it is fed into both sides of the circuit at gates G9 and G10. The two "0" inputs to gate G9 produce a "1" output from G9 and the "1" and "0" input to gate G10 produce a "0" output therefrom. Therefore, a "1" is applied to the left side of memory M3 and a "0" is applied to the right side of memory M3. This produces a "0" output from the left side of memory M3 and a "1" output from the right side of memory M3. These signals are fed back to gates G3 and G4, respectively. The outputs of memory M3 are also applied to gates G11 and G12, which determine the order of production of the clock signals C1 and C3. If there is a "1" input into gate G11, clock pulse C3 cannot occur and the same is true with gate G12.

The derivation of the order of clock pulses C1 and C3 will be apparent from noting that the outputs of G7 and G8 are applied to the inputs of gates G11 and G12, respectively. It may be seen that gate G12 has a "1" input from memory M2. Therefore, a C1 pulse will not occur during interval $I_1$. However, the inputs to G11 from memory M3, memory M2 and G7 are all "0"; therefore, gate G11 will produce a C3 pulse at interval $I_1$ (see FIGS. 12 and 14).

At time $t_3$, commencing interval $I_2$, FIG. 12, there is a change in the outputs C and C' of oscillator 34. Terminal 34a goes to "0" and terminal 34b goes to "1." This produces an immediate change in circuitry conditions and production of clock pulses C2 and C4. It will be recalled that clock pulse C1 did not occur in the first described cycle of operation because a "1" was present in the input to gate G12, from the right side of memory M3. This "1" from the right side of memory M3 was also fed back to the input of gate G3. Thus when the "0" from oscillator terminal 34a and the "1" from the left side of memory M3 are applied to gate G3 the output will be "0." This "0" is inverted to a "1" in gate G5 and the resulting "1" output from gate G5 will continue to enable production of "1" level output at gate G5 during interval $I_1$. At the same time during interval $I_1$, a "0" was fed back to gate G4 from the left side of memory M3. This "0" coincides at gate G4 with the "1" output of terminal 34a during interval $I_1$ which produces a "0" output at gate G4 and enables continuation of production of a "1" level output from gate G6. This also produces a "1" output at gate G8 which is applied to the right side of memory M2, which further suppresses the production of a C1 pulse from gate G12. However, the "1" input to the right side of memory M2 resets the left side of memory M2 producing a "1" output which inhibits production of a C3 "1" pulse at gate G11 during interval $I_2$.

At time $t_4$ ($t_0$) commencing interval $I_3$, gates G3 and G4 receive a C "1" pulse from terminal 34a which regardless of the feedback to gates G3 and G4 means that gates G5 and G6 will produce "1" level outputs. Because of this, gates G7 and G8 have "0" outputs, and both of these "0" outputs are fed directly to the inputs of gates G11 and G12, respectively. The "0" inputs to the left side of memory M2 from gate G7 together with a "0" input from the right side of memory M2 makes the output of the left side of memory M2 a "1." A "1" from the left side of memory M2 together with a "0" from gate G8 makes the output of the right side of memory M2 a "0." Gate G12 then receives a "0" input from the right side of memory M2. The output from the left side of memory M2 which is a "1" is fed directly to G11 which suppresses the production of a C3 "1" pulse. At the same time the right side of memory M3 has a "0" output which is applied to the remaining input of gate G12. Inasmuch as all of the inputs to gate G12 are "0" a C1 pulse will occur at time $t_4$ ($t_0$).

At the next interval of time $I_4$, commencing at $t_1$ oscillator terminal 34a is "1" and terminal 34b is "0." The feedback signal to gate G4 has a value of "1" while both the feedback and input signals to gate G3 are "0." Following both sides of the circuit through it will be seen that the usual inversion will produce a "0" output at gate G5, a "1" output at gate G6, and suppress a C4 "0" pulse. On the left side of memory M2 a "0" from the right side of memory M2 and a "0" from the line make the left side output of memory M2 a "1." At the right side of memory M2, however, a "1" from the line and a "1" from the right side of memory M2 produce a "0" at the left side of memory M2. Production of a "1" C3 pulse is thus suppressed because a "1" has been delivered by gate G7 to gate G11. A C1 pulse is suppressed because a "1" has been delivered to gate G12 from the right side of memory M2.

The table of FIG. 14 shows the production of the clock pulses relative to each other at the intervals of time $I_1$, $I_2$, $I_3$ and $I_4$ indicated in FIG. 12. The clock pulses serve two primary purposes. The even number clock pulses are used for gating and the odd number clock pulses are used for resetting memories.

In practice pulses C1 and C3 may slightly overlap C2 and C4, respectively, because of inherent time delays in the circuit. However, this poses no problem in the manner that the clock pulses are utilized. It may be noted that there is a one-half clock cycle difference in the occurrence of C1 and C3 and also in the occurrence of C2 and C4. The clock pulses may be amplified in order to have sufficient power where utilized throughout the system. As will hereinafter be made apparent, all events are synchronized by the clock pulses and dependent thereon.

*Shift and scaling control*

The tape reader and reader-control identified by the blocks 18 and 18a in FIG. 4 are preferably in one unit. A satisfactory unit is one marketed by the Rheem Electronics Corporation of Los Angeles, Calif., and identified as an RR-300MB Photocell Punch Tape Reader which is used in conjunction with that company's RS-300M Tape Spooler. Briefly, this reader is a photoelectric device with a plurality of separate elements for sensing perforations in tape 2, FIG. 2. These elements provide a plurality of information track outputs and one timing track output. The information tracks each sense the perforations in a given channel as shown in FIG. 2, and the timing track senses the existence of a sprocket perforation. When the sensing elements sense a perforation they provide to their respective track a minus voltage output and when no perforation is sensed the output of the track is "0" voltage. Therefore, this unit in each sensing track would provide a negative voltage output on the tracks which sensed a perforation in the tape.

The information tracks of the tape reader are each applied to an associated register, for example, the three temporary storage shift registers for the axes commands, and the feedrate number register. As each bit of information is applied to the least significant position (LSB) in a register all information bits are shifted to the next higher position to leave the LSB clear to receive the next bit of information from the tape reader.

It will be recalled that as a block of tape is read into the temporary storage section each bit of information is successively shifted in its respective storage register until the end of block notation is read. At this point shifting is halted and the scaling operation is commenced. However, the feedrate number in the feedrate temporary storage register is not scaled. FIG. 15 illustrates the manner in which the shifting of the information is halted and scaling is initiated, and also, in conjunction with FIG. 16, the manner in which the shift control of the feedrate temporary storage register is disabled during scaling. The bit in the LSB of the temporary axes command storage registers is not scaled inasmuch as it indicates the commanded direction of movement. This bit is utilized for directional command with respect to a particular axis as explained in conjunction with FIG. 9.

When tape reader 18 reads the end of block notation it furnishes a setting signal to the left side of memory M4, FIG. 15. A "0" ouput from memory M4 is then applied to gate G13 together with a signal indicative of the reading of a sprocket hole in the same row as the end of block notation. The sprocket hole reading is inverted at gate G14 prior to application to gate G13 to provide a "0" signal. As a result of the coincidence of these two "0" signals gate G13 supplies a stop reading signal to tape reader 18 and also a "1" signal to inverter gate G15. The "0" output of gate G15 is applied to coincidence gate G16. When gate G16 does not receive a signal from a most significant bit in one of the $dx$, $dy$ or $dz$ temporary storage registers, which is a "0" input, a "1" output from gate G16 will set a scaling memory M5 which then allows scaling to commence as hereinafter described.

Reference is now made to FIG. 16 which schematically and logically illustrates the operation of register shift control 24 and scaling control 25. It will be understood that shifting of the successive bits of the numbers introduced into the temporary storage registers occurs until the end of block notation is read by tape reader 18. At this time scaling may commence. The operations of the shift control and scaling control will initially be explained with reference to one position of feedrate temporary storage register 19 which will exemplify the shifting and scaling operations with respect to the other temporary storage registers. In FIG. 16 memories M6 and M7 together with associated gates G17 and G18 represent two bit positions or stages in temporary storage register 19. The function of the register shift control 24, which is illustrated as a serial shift pulse generator, is to move or shift succeeding bits of information along the positions or stages of the temporary storage registers as exemplified by register 19 as each additional row of tape is read into the system.

The shift of each bit of information to the next significant place in a register is enabled by a "1" output signal from gate G20. Gate G20 senses the coincident occurrence of a clock pulse C2 and a signal from tape reader 18 indicating that a row of tape has been read. Gate G20 has an output once, and only once, for each row of perforations read from the tape, except the row containing EB, and the input signal applied thereto from the tape reader occurs upon sensing of a tape sprocket hole SH. The output signal of gate G20 is applied to the left side of memory M9. Memory M9 receives three inputs, one to clear all registers, the second to shift the numbers in the registers as the tape is read, and a third from scaling control gate G21 as hereinafter explained.

When the tape is being read memory M9 is set once for every row at C2 and reset at C1. Therefore, upon application of clock C4 to gate G22, gate G22 applies a setting signal to memory M10. When memory M10 is set and at time C2 gate G23 applies a setting signal to memory M11. In this manner a shift pulse is propagated along shift control 24. The output of the left side of memory M11 supplies a shift command to a bit position in the temporary storage registers. As here illustrated it supplies a shift command over line L10 to gate G18 in register 19. The output of memory M10 applies a reset command to memory M7 over line L11 and through gate G24. The output of M11 is then applied to successive positions of a serial chain of memories and associated gates arranged as shown in FIG. 16 which serially apply both a reset signal and a shift command to successive positions in all the temporary storage registers. Each position of a temporary storage register comprises a bi-stable device having an associated gate a exemplied by memories M7 and M6 and gates G18 and G17. During the first half of a clock cycle, the information bit in one stage (memory M7) is transferred to the memory of the succeeding higher order stage (memory M6). During the second half of the clock cycle the memory of the first stage is reset. During the second half of the clock cycle, the information bit in the stage preceding memory M7 is transferred through gate G18 to memory M7. It will be understood that the reset line L11 and shift command line L10 lead to a given position in each of the temporary storage registers. In a similar manner memory M9 applies a shift command to gate G17 over line L12. It will be noted that shift register 19 and shift control 24 are arranged for serial operation. However, simultaneous shifting of all of the bits in the temporary storage registers may also be utilized if desired. This would require the provision of shift registers with a temporary holding memory and associated gate in each register position, which are well known to those skilled in the art.

The memories M6 and M7 each represent a binary digit position in the temporary storage shift registers and here represent the two most significant positions in feedrate register 19. However, they may be considered representative of binary digit positions in the other shift registers, except for two features now explained. In the length of block, $dx$, $dy$, and $dz$ shift registers the input to gates G17 and G18 from scaling memory M5, FIG. 15 are not present. Also, in the temporary storage shift registers other than feedrate register 19, gates such as G24 are not present. The purpose of the input from memory M5, FIG. 15 and gates such as gate G24 is to prevent scaling of the number in the feedrate register. This input from memory M5 inhibits scaling of the feedrate number in register 19. In the length of block register the memories are not reset as scaling occurs, since it is desired to set a number of memories indicative of the length of the longest axis position command or otherwise stated, the length of the block of information read from the tape.

Returning now to discussion of the shift control, when memory M9 is set, gate G17 at C4 passes the content of memory M7 to memory M6. At the same time memory M10 is set by gate G22. Then memory M10 over line L11 and through gate G24 resets M7, and also sets memory M11 through gate G23 at C2. When memory M11 is set by gate G23 it opens via line L10, gate G18 which passes the contents of the previous register position into memory M7.

In the manner described it may be seen that the binary digits read into the temporary storage registers are successively shifted from position to position as they are read in to allow the least significant bit positions to be cleared after each reading to receive the next row of information from the tape. The fastest possible read-in rate is one digit every shift cycle. However, in practice the reader 18 will not operate at this speed. FIG. 16 illustrates the input end of the shift register control. The terminal end of shift control will hereinafter be described in conjunction with FIG. 17. It will be understood that the stages therebetween will be the same as represented by memories M10 and M11 and associated gates G22 and G23.

When the information on the tape has been read into the storage registers and the end of block notation sensed the tape reader will stop reading as explained in conjunction with FIG. 15 and gate G20 will no longer supply shift commands to memory M9. When the end of block notation is sensed by the tape reader it sets memory M4, FIG. 15, which then supplies a signal to scaling memory M5 which states in effect that the numbers have been read into temporary storage and scaling may be commenced. Memory M5 may therefore be considered to be a scaling command memory. When memory M5 is set the left side has a "0" level output which is applied to coincidence gate G21.

Coincidence gate G21 receives a plurality of inputs, any one of which if a "1" will block gate G21 and prevent operation of shift control 24 by a scaling command and thereby prevent scaling. Gate G21 receives an input through "OR" gate G25 and inversion gate G26 from the most significant bit position (MSB) of any of the $dx$, $dy$ and $dz$ temporary storage registers as represented by memories M13, M14 and M15, respectively. When the most significant bit of any of these registers is set indicating the presence of a binary "1" it will apply through "OR" gate G25 and inversion gate G26 an inhibiting signal to gate G21 and prevent further scaling. Gate G21 also receives an input from the right side of memory M10. This input to gate G21 from memory M10 serves to hold gate G21 closed every other clock cycle. This is done to prevent simultaneous setting of successive memories in shift control 24 and thereby inhibit any "racing" condition through gates such as G17 and G18 in the temporary storage registers, which would occur if all gates were opened simultaneously. Also, several or all gates such as G24 in feedrate number temporary storage register 19 would feed reset signals into their associated memories and thereby reset the memories before their contents had been shifted into the succeeding position memory.

Shift control 24 is utilized to clear all temporary storage register positions. In FIG. 16, memory M8 is a clearing memory which is set either by a manual signal or by a signal dump gate 26 immediately after transfer of data from temporary to active storage so that temporary storage is cleared in time to receive the next block of information. If M8 is set, gate G19 will emit a pulse every clock cycle, fill shift control register with "1's" and produce the condition previously avoided. Memory M8 is reset by the first pulse to reach the end of shift control register.

In some cases where the feedrate number FRN is large indicating a fast desired workrate and the $dx$, $dy$ and $dz$ commands are small, scaling may be inhibited or halted prior to the longest of the $dx$, $dy$ and $dz$ commands reaching the most significant bit MSB of its register. The reason for this may readily be understood when it is recalled that it takes seven clock cycles for a carry to propagate through the serial section of the command pulse generator. The maximum rate at which the command pulse generator parallel counter section 61 can accept $f_3$ pulses is one $f_3$ pulse per clock cycle. Therefore, if parallel section 61 of command pulse generator 60 overflows before seven clock cycles occur, it may again start counting $f_3$ pulses before serial section 62 overflows and thereby introduce an error into the system. This could possibly occur if FRN was large and the length of block register filled all but the two least significant bits of the command pulse generator. Early scaling terminating gates such as gate G27 make sure that interpolation takes at least a minimum number of clock cycles (sixteen, as disclosed) to prevent parallel section 61 from overflowing before serial section 62. The early terminating gates are arranged to sense when the sum of the leading positions in the length of block register which are in a "0" state and the feedrate temporary storage register is four, and terminate scaling. This arrangement takes into account the fact that even after scaling is inhibited some shift pulses may still be propagating through shift control 24.

As illustrated, early scaling terminating gate G27 receives inputs from feedrate storage register 19 at the thirteenth bit position and an input from length of block register 20 at the seventh bit position. If gate G27 received both of these inputs it would indicate that the feedrate number was undesirably long for the commanded distance of movement. Therefore, gate G27 would supply an inhibiting signal to gate G21. It will be understood that other gates similar to gate G25 may be provided, for example, ones that would sense bit position twelve of register 19 and bit position nine of register 20; bit position eleven of register 19 and bit position eleven of register 20; etc., to determine combinations of the magnitude of the feedrate number and the longest axis command which is deemed imcompatible. Also, other combinations than those described may be taken dependent on the operation desired.

Reference is now made to FIG. 17 which illustrates the terminal end of shift control 24. Memory M16 receives an input from a previous shift pulse generating stage as exemplified in FIG. 16. The output of memory M16 is applied to coincidence gates G29 and G30. When memory M16 is set at clock pulse C2, gate G29 applies a resetting signal to a corresponding stage in the temporary storage registers and also a setting signal to memory M17. Gate 30 also receives an input signal from scaling memory M5 FIG. 16, which inhibits gate G30 when scaling memory M5 is set, indicating that a scaling function is taking place. Gate G30 will transfer a setting signal to memory M18 only when there is no scaling signal from memory M5. Memory M17 is set for every shift pulse during reading of the tape and applies a signal to coincidence gate G31. During scaling, memory M18 which operates on the least significant bit positions of the temporary storage registers, is not set by gate G30 and therefore memory M19 cannot be set through gate G32. The reason for this will be apparent when it is recalled that the least significant bit in the axes temporary storage registers which denote direction are not shifted during scaling.

Memory M20 is set when it is sensed that a "1" is stored in memory M17 and there is no "1" bit in the second preceding stage. This indicates that a scaling shift pulse has reached the terminal end of shift control 24 and there is no following shift pulse. At this time scaling is completed. In response to these coincidence conditions gate G33 sets memory M21 which in turn enables dump control gate G26. The false side output of memory M19 is applied to coincidence gates G34 and G35. At clock pulse C2, gate G34 supplies a resetting signal to the LSB's in the temporary storage registers (except when scaling), and gate G35 supplies a resetting signal to memory M8 (FIG. 16) to indicate that temporary storage is cleared to receive the next block of input information.

It will be recalled that during scaling, length of block register 20 has binary "1's" set therein for each shift to obtain an indication of the largest axis command. Therefore, the reset signals from shift control 24 as indicated by the outputs from gate G23 (FIG. 16) and gate G29 (FIG. 17) are not applied to corresponding positions in length of block register 20 during scaling.

Overflow register

FIG. 18 illustrates one stage of section 52a of overflow register 52. It will be recalled that overflow register 52 is in a parallel adder which repetitively adds the feedrate number to the number in register 28 to produce pulse frequency $f_3$. Overflow register 52 receives its input either from feedrate number active storage register 28 through add gate G51 or potential jog pulses from number-to-frequency converter 43. The pulse frequency $f_2$, when the system is in jog mode, is applied to add gate G56 of section 52a of overflow register 52, one of which is represented by gate G37 in FIG. 18. When in the tape mode, pulse frequency $f_2$ opens feedrate number add gate G51 as represented by gate G38 in FIG. 18. In either case the bit to be added in a particular stage or position of overflow register 52 is applied to memory M23 while any carry from the previous stage is applied to memory M24 over lines L14 and L15. The function of memory M23 is to accept a bit to be added from an add gate. Memory M25 holds the bit presently in the stage during one-half of a clock cycle, while memory M26 holds the bit presently in the stage during the other half of a clock cycle. Memory M27 remembers a carry from the addition of the contents of memories M24 and M25 if one is present in the first half of a clock cycle for one-half of a clock cycle, from C2 to C4, then the carry is gated to the next stage.

Assume now that memory M25 commencing on a given clock cycle is holding a binary "1" or a binary "0" and the input to memory M24 sets that memory in a state indicative of a binary "1." During the first half of the clock cycle the bits in memories M24 and M25 are added by gates G39 and G40. If the result of this addition is a sum bit, and possibly a carry bit, the sum bit if a "0" is applied to memory M26 and the carry bit, if present, is applied to memory M27. During the second half of the clock cycle the bits in memories M23 and M26 are added by gates G41 and G42 and the result of this addition is applied to the right side of memory M25. If as a result of this last-mentioned addition a carry is present it is sent to the next stage of the overflow register on line L14' and the contents of memory M27 are passed through gate G43 over line L15' in a similar manner as the inputs are applied to memory M24 from the previous stage over lines L14 and L15. Lines L14 and L15 and L14' and L15' never simultaneously have a carry pulse. The above described cycle is then repeated during the next clock cycle. The stage illustrated in FIG. 18 represents a stage in section 52a, FIG. 8, of the overflow register. However, it will be apparent that a stage in section 52b of the overflow register as illustrated in FIG. 9 will be identical. The overflow of the repetitive addition in register 52 thus provides pulse frequency $f_3$ or jog pulse frequency $f_5$, as here described.

Non-carry pulse detection

FIG. 19 illustrates one position of a counter including logic means for detection of non-carry pulses, as may be utilized in binary frequency generator 36, and command pulse generator 60. Memory M28 receives from the preceding stage of the counter a carry pulse, if a carry pulse has been generated in the preceding stage. Memory M29 contains a bit stored in the illustrated position of the counter. Memory M30 functions to remember the previous state of memory M29 during a change in state of memory M29. Memory M31 detects the existence of a non-carry pulse in the illustrated stage of the counter, which operates as follows:

If a carry pulse is applied to memory M28 and memory M30 is not set, then memory M29 is set to the opposite state of M30. When M29 changes from a "1" state to a "0" state, a carry pulse is sent to the next counter stage. However, when memory M29 changes from a "0" state to a "1" state memory M31 is set through memory M30 and gate G44 by the same pulse that sets memory M29 to a "1" state. When memory M31 is set it produces a pulse which is indicative of the fact that no carry has been forwarded to the next counter stage and therefore produces a "non-carry" pulse. If at the beginning of a clock cycle memory M28 does not receive a carry pulse gates G44 and G45 remain closed, and memory M29 does not change its state. The binary digit content of memory M29 is copied into memory M30 through gate G46 at every C4 pulse.

Feedrate selector control

The purpose of the feedrate selector control is to provide a pulse frequency $f_1$ proportional to a manually selected feedrate number, which in the disclosed embodiment of the invention is expressed as a percentage of the feedrate number FRN programmed on the tape. Selector switch 41 as here described has thirty-two positions, from 0 to 124% of the programmed feedrate number FRN. The position of selector switch 41 establishes a representation of such position in Gray code as previously mentioned. The representation of the position of selector switch 41 in Gray code is utilized to gate corresponding frequencies of binary frequencies $bf_1-bf_5$ in accordance with the well known rules of Gray-to-binary code conversion.

Conversion is accomplished by first writing the most significant digit of the Gray code then adding this digit to the next lower order Gray digit noting the sum which is the next lower order binary and then proceeding in a similar manner along the length of the Gray code number, ignoring carries.

In the disclosed system this conversion is accomplished logically through use of a network as shown in FIG. 20, which illustrates an array of gates arranged to provide such conversion. The binary related frequencies $bf_1$–$bf_5$ are applied to gates G48–G52, respectively, the highest frequency $bf_1$ being applied to gate G48. The binary coded number converted from the Gray code is represented by the states of gates G53–G57, each representing a binary position with gate G53 representing the highest order position $2^5$ and gates G54, G55, G56 and G57 representing successively lower binary positions. Gates G53–G57, dependent upon the conductive condition thereof representing a particular binary number, are effective to enable gates G48–G52, respectively, so that selected ones of frequencies $bf_1$–$bf_5$ are summed by a bi-stable device M33, providing an "OR" function to produce pulse frequency $f_1$. Gates G58–G61 are either enabled or inhibited by the lower four-order bits of the Gray code. Gates G58–G61 receive a signal from terminals GC4–GC1, respectively, which have a potential applied thereto indicative either of a Gray code "1" or a Gray code "0." This potential is also applied to gates G62–G65 which provide an inversion function for purposes hereinafter made apparent. Gates G66, G67, G68 and G69 are provided for the carry or addition function in Gray-to-binary conversion.

The operation of the network of FIG. 20 may best be explained by considering a numerical example of conversion. Assume that the selector switch is in such a position as to call for a pulse frequency $f_1$ which is $11/31$ of $124\%$, or $44\%$ of the programmed feedrate number FRN. This would correspond to the eleventh position of selector switch 41 and a Gray code number of 1110. This corresponds to a binary number 1011 and therefore gates G49, G51 and G52 must be enabled to pass frequencies $bf_2$, $bf_4$, and $bf_5$. Selector switch 41 will cause terminals GC4, GC3 and GC5 to be energized with a negative potential indicative of the "1" state. Terminals GC1 and GC5 will not be energized. In the example given for FIG. 20 the gates having a "0" output are shaded while those having a "1" output are not.

It will be noted that gate G53 receives a "0" signal from terminal GC5. Therefore, the output will be "1" and will hold gate G48 closed and pulse frequency $bf_1$ is not found in the resulting frequency $f_1$. Gate G66 receives a "0" input from terminal GC5 and also a "0" input from gate G62; therefore, gate G66 will provide a "1" output which inhibits gate G67. Gate G67 also receives "0" signals from G58 stating that there is a "1" bit in the fourth order Gray position and a "0" from G63 stating there is a "1" bit in the third order Gray position. Gate G54 senses that gate G66, at a "1" output, is stating that there is no Gray code "1" in the fifth order position and there is a Gray code "1" in the fourth order position as represented by the condition of gate G62. Therefore, gate G54, which also receives a "0" input from gate G58 provides a level output indicative of a binary "1" in the fourth order position to gate G49 thus enabling gate G49 at clock C4 to pass $bf_2$ pulses.

Gate G55 receives a "0" signal from gate G59 which states that there is a Gray "1" in the third order position and a "0" signal from gate G67 which states that the fourth order binary position contains a "1." Therefore, gate G55 will have a "1" output which is applied to gate G50 and inhibits gate G50 to prevent passage of frequency $bf_3$. Gate G55 has added the fourth position binary "1" and the third position Gray "1" and therefore indicates that the third position binary number should be "0."

Gate G68 receives a "0" signal from gate G67 stating that the third order binary digit is "0", a "0" signal from gate G59 stating that the third order Gray digit is "1" and a "0" signal from gate G64 indicating that the second order Gray digit is "1." The result thereof is a binary "1" digit in the second order binary place. Therefore, gate G68 supplies a "1" signal to gate G56. Gate G56 then has a "0" output which is applied to gate G51 to enable gate G51 to pass frequency $bf_4$ at C4.

Gate G69 receives a "1" signal from gate G68 which states that the second order binary position contains a "1", a "0" signal from gate G60 stating that the second order Gray position contains a "1", and a "1" signal from gate G65 stating that the first order Gray digit is "0". The resultant output of gate G69 in view of these conditions is "0" which is applied to gate G57. Gate G57 also receives a "0" signal from gate G61 indicative of the fact that the first order Gray digit is a "0." Inasmuch as there is a "1" input to gate G57 from gate G69 the output of gate G57 will be "0" which will enable gate G52 to pass frequency $bf_5$.

The frequencies $bf_2$, $bf_4$ and $bf_5$ are then summed in memory 33 which provides an "OR" function. Memory M33 will be reset every clock cycle by clock pulse C3 and set by any one of the pulses in frequencies $bf_2$, $bf_4$ and $bf_5$.

Reconsidering FIG. 20 it may be seen that the condition of the gates G53, G54, G55, G56 and G57 in descending vertical order as shown represent the binary number 1011 as do the gates G48–G52 in the same order but in inverse condition. The gates G62–G65 and G58–G61 in the same order represent, dependent upon their state, the Gray coded number, excepting the most significant position. From the foregoing conversion example the operation of the network of FIG. 20 will be apparent. Gates G66–G69, dependent on their state, determine if a selected order binary digit is to be "1" or "0" dependent on the same order Gray digit and the next highest order binary digit.

The output of memory M33 is applied to coincidence gate G70 which is enabled at C2 to pass pulse frequency $f_1$. Gate 70 may be inhibited under certain conditions to prevent passage of $f_1$ pulses by a disabling signal, hereinafter explained.

*Frequency comparator*

It may thus be seen that frequency override control 40 provides a means for generating a pulse frequency $f_1$, proportional to a position of a frequency selection means, switch 41, which determines the rate of generation of command pulses from command pulse generator 60.

The pulse frequency $f_1$ generated by feedrate override control 40 is converted to a number in the internal feed adjustment register 42 which in turn generates a pulse frequency $f_2$. In some cases the pulse frequency $f_1$ is varied by changing the position of selector switch 41. However, the pulse frequency $f_2$ is prevented from changing except at a controlled rate when pulse frequency $f_1$ is changed. To control the rate at which pulse frequency $f_2$ may change a frequency comparator 46 is provided which detects the differences, if any, in frequencies $f_1$ and $f_2$ and in response to any difference in frequency increments or decrements the bi-directional counter comprising the internal feed adjustment register at a predetermined rate.

Reference is now made to FIG. 21 which schematically and logically illustrates frequency comparator 46. Frequency comparator 46 comprises a memory unit M34 which is set upon receipt of $f_1$ pulses and reset, when set, at clock pulse C1. Gates G71 and G72 are provided to sense, respectively, the set and reset conditions of memory M34. Pulse frequency $f_2$ is applied directly to gate G71 and to gate G72 through an inversion gate G73. Gates G71 and G72 will have no outputs when $f_1$ and $f_2$ pulses occur at the same time or do not occur.

To explain the operation of the network of FIG. 21 assume that an $f_1$ pulse but not an $f_2$ pulse is received. This condition would indicate that selector switch 41 has been changed to increase pulse frequency $f_1$. Under this condition memory M34 is set, and "0" signals are applied to gate G71 from memory M34 and the $f_2$ input lines. Gate G71 may then have an output at clock pulse C4 which sets memory M35. Memory M35 when set by gate G71 signifies that pulse frequency $f_1$ is greater than pulse frequency $f_2$ and when reset by gate G72 it signifies that pulse frequency $f_2$ is greater than $f_1$. Memory M35 will remain in the last condition in which it was set or reset. An output signal from memory M35 is applied to either gate G74 or gate G75 dependent upon the condition thereof. Gates G74 and G75 are enabled during clock pulse C2, when a $bf0$ signal is present. The $bf0$ signal occurs every 128 clock cycles and is the overflow pulse from binary frequency generator 36. It will be recalled that the binary frequency is basically a seven-position unidirectional counter. Therefore, every 128 clock cycles when gate G74 senses that $f_1$ is greater than $f_2$ gate G74 sets memory M36 which is the first increment memory of internal feed adjust register 42. Similarly, memory M37 is the first decrement memory of the internal feed adjust register 42 and is set by gate G75 every 128 clock cycles when $f_2$ is greater than $f_1$. A memory M38 and associated gate G76 are provided between gate G75 and memory M37 for purposes of delay. The first stage of the counter accepts increments at C2 and decrements at C4, hence the delay.

Thus, every 128 clock cycles the eight-bit counter comprising register 42 may be incremented and decremented. It may now be seen that the number held in the internal feed adjustment register and hence frequency $f_2$ can only change at a controlled rate. It will be of course understood that the rate at which this number is allowed to change is variable. For example, if desired the gates G74 and G75 could be enabled at a lesser or greater number of clock cycles.

To further illustrate the example of the frequency comparator and internal feed adjustment register let it be assumed that the selector switch 41 is turned to a zero setting which cuts off generation of pulse frequency $f_1$. At this time pulse frequency $f_2$ would be greater than $f_1$ and the bi-directional counter comprising internal feed adjustment register 42 would be decremented to zero at a controlled rate to prevent abrupt removal of command pulses from the servo system. It is understood that the command pulses to the servo systems are applied at a rate proportional to overflow frequency $f_3$ which in turn is proportional to gating frequency $f_2$. At this point it becomes readily apparent that the system could be operated by applying the $f_1$ pulses directly to feedrate add gate G51 to gate the feedrate number in active storage register 28 to overflow register 52. However, a network comprising the internal feed adjustment register 42 and frequency comparator 46 provides means for controlling the rate of change of the gating signal applied to feedrate number add gate G51.

*Mode logic, sign and axes selection logic*

The system may be operated either in a tape mode or under manual control in a jog mode. The purpose of the mode logic, and jog control sign and axes selection logic, FIG. 22, is to allow selection of the mode of operation and to allow the manual controls to introduce changes into the system only when the number held in internal feed adjustment register 42 is zero. When this number is zero, pulse frequency $f_2$ is not produced. Since changes may only be introduced into the system when the feedrate is zero the controlled members do not experience any abrupt shocks and resulting stresses due to acceleration and deceleration.

Means are provided to detect when the number held in internal feed adjustment register 42 is zero, comprising a memory M40 which is set by $f_2$ pulses and reset by a signal $bf0'$. The signal $bf0'$ is a slightly delayed $bf0$ signal which may be produced by passing the $bf0$ signal through a memory and associated gate which only opens after occurrence of the $bf0$ signal, to produce $bf0'$. When memory M40 is set by an $f_2$ pulse it applies a "1" level signal to a gate G78 which is otherwise enabled once every 128 clock cycles by the $bf0$ signal. A "0" output signal from gate G78, if present, signifies that no $f_2$ pulses have been received in the time between $bf0'$ and $bf0$ (almost 128 clock cycles) and therefore the numerical content of internal feed adjustment register 42 is zero (IFA=0). The IFA=0 from gate G78 signal is utilized to allow changes in the system which would be inhibited in the absence of this signal.

The pulse frequency $f_1$ from which pulse frequencies $f_2$ and $f_3$ or $f_5$ are derived is passed by gate G70, FIG. 20, so long as gate G80 is not inhibited by a disabling signal from "OR" gate G79 in the mode logic, sign and axes selection logic network of FIG. 22. The mode logic previously identified by reference numeral 54 generally comprises a tape mode logic circuit 90, a jog mode logic circuit 91, and a mode selector switch 92 for selecting either tape or jog modes. The jog control sign and axes selection logic 59 generally comprises an axis selection logic circuit 93 for each axis (only one shown, for the Z-axis), a directional sign logic circuit 94, and a jog pulse distributing circuit 95 (only one axis of distribution shown). Associated with tape mode logic circuit 90 is a travel limit logic circuit 97 for each axis (only one shown). Associated with directional sign logic circuit 93 is a travel limit logic circuit 96 for each axis (only one shown). Associated with tape mode logic circuit 90 and travel limit logic circuit is a coincidence gate G80. This gate senses three basic conditions, that a travel limit switch LS is not tripped in the direction that the controlled member is commanded to more (from circuit 96), that tape mode memory M41 in circuit 90 is set for tape mode and selector switch 92 is set for tape operation through inversion gate G81. When these conditions simultaneously occur all inputs to gate G80 are "0" and the output is "1."

Gate G82 associated with jog control, sign and axis selection circuit 59, senses the following conditions to provide a "1" output:

(a) jog mode circuit 91 is set for jog operation (from jog mode memory M43 in circuit 91)

(b) selector switch 92 is set for jog mode (from gate G83)

(c) the selected axis logic circuit is set for that axis and axis selector switch 98 is in a position agreeing with the setting of the associated axis logic circuit (from gate G84 through gate G85)

(d) the directional sign selector switches PB— and PB+ are in a position agreeing with the setting of circuit 94 (from gate G86), and (e) travel limit switches LS are not tripped in the direction of movement of the controlled member (from gates G87 and G88)

So long as either of gates G80 and G82 have a "1" output, the output of gate G79 will be "0." The "0" output of gate G79 enables gate G70, FIG. 20, to pass pulse frequency $f_1$. If gate G79 should have a "1" output, it will inhibit gate G70 and prevent passage of pulse frequency $f_1$. This in turn causes internal feed adjust register 42 to decrement to zero, at a predetermined rate and pulse frequency $f_2$ will decrease accordingly to zero.

Assume that the system is set to operate in the tape mode. Selector switch 92 is set at contact T. This causes inversion gate G81 to have a "0" output. Tape mode memory M41 in circuit 90 must also have a "0" output. For memory M41 to have a "0" output, the left side thereof must receive a "1" input from gate G89. Gate G89 will produce a "1" output when it receives a "0" signal from gate G90 signifying that mode selector switch 92 is at contact T and a "0" signal from gate G91 stating that a "0" $bf0$ signal has been applied to gate G78. Tape mode memory M41 will remain in a state indicative of the tape mode operation unless gate G92 detects that selector switch 92 is moved from contact T and a $bf0$ signal is received by gate G78. Under these conditions gate G92 will reset memory M41.

Gates G93 and G94 receive signals from travel limit switches LS— and LS+, respectively, and also inputs from memory M42 which is set by a directional signal signifying a negative direction of travel along a particular axis. Gates G93 and G94 will have "0" outputs so long as a travel limit switch is not tripped in the direction the controlled member is commanded to move with respect to each axis.

When all of the inputs to gate G80 are "0," it will produce a "1" output and hold gate G79 off, thus enabling production of pulse frequency $f_1$.

Assume now that jog mode operation is desired and selector switch 92 is moved to jog terminal J. Inversion gate G81 will immediately apply a "1" signal to gate G80, turning gate G80 off. Now, unless gate G82 supplies a "1" input to gate G79, the production of pulse frequency $f_1$ will be inhibited.

Jog mode logic circuit 91 is identical to tape mode logic circuit 90, and the gates thereof bear the same reference numerals. Jog mode memory M43 is set upon receipt of $b/0$ by gate G78 when selector switch 92 is a terminal J. When memory M43 is set it applies a "0" signal to gate G82. Gate G82 also receives a "0" signal from gate G83 if selector switch 92 is at terminal J. Thus circuit 91 and inversion gate G83 apply enabling signals to gate G82.

For each axis of motion an axis selection logic circuit 93 is provided. Each of these circuits is the same as circuit 90 and the gates thereof bear the same reference numeral. The axis selection logic circuits each operate from axis terminals TZ, TY, and TX of axis selection switch 98. Each axis selection circuit includes an axis memory M44, and a switch terminal inversion gate G95.

At this point the use of the jog control may be considered. If the operator wishes to move a controlled member with respect to a particular axis he first sets mode selector switch 92 at J, sets axis selection switch 98 at a terminal corresponding to the desired axis of motion, and then closes a switch PB+ or PB− to select the direction of motion. At this time $f_5$ pulses may be directed to the appropriate input of the servo system controlling the selected axis of motion. Pulse frequency $f_5$ is applied to a gate G96 which is enabled by jog memory M43 when it is set for jog mode. The $f_5$ pulse output of gate G96 is applied to gates G97 and G98 which are enabled by sign memory M45 in circuit 94 dependent on the direction of motion selected. Pulse frequency $f_5$ is then passed by one of gates G97 or G98 to Z-axis gates G99 or G100 which are enabled by axis memory M44 of Z-axis circuit 93 to the selected input of the Z-axis servo system.

Gate G82, when all of the inputs thereto are "0," applies a "1" input to gate G79 and gate G79 will enable production of pulse frequency $f_1$. When selector switch 92 is at tape terminal T, gate G83 has a "1" output which holds gate G82 closed. Similarly, when selector 92 is at jog terminal J, gate G81 has a "1" output which holds gate G80 closed. Therefore, when the system is operating in the tape mode gate G80 will control production of pulse frequency $f_1$ and when the system is operating in the jog mode gate G82 controls production of pulse frequency $f_1$.

Sign memory M45 in circuit 94 is set in a state indicative of the desired direction of travel by gates G101 or G102. Each of gates G101 and G102 is enabled by the IFA=0 signal through inversion gate G108 and a signal from one of inversion gates G103 or G104, respectively, which have a "0" output when an associated directional switch PB− or PB+, respectively, is closed. Assume that switch PB− is closed and an IFA=0 signal is present. Then the left side of memory M45 is set and has a "0" output, as does inversion gate G105. Gate G106 senses these conditions and applies a "1" signal to "OR" gate G86 which in turn applies a "0" signal to gate G82. When the left side of memory M45 is set as described, the right side may not be set until a succeeding IFA=0 signal is received from gate G78. This prevents an abrupt reversal of direction of a controlled member. Under the conditions just described the left side of memory M45 enables gate G97 to pass $f_5$ pulses to the negative direction input of the Z-axis servo if Z-axis memory M44 is set and enables gate G99.

If directional switch PB− is released and PB+ is now depressed to reverse the direction of movement of the controlled member, inversion gate G105 inhibits gate G106 and gate G86 applies a "1" signal to gate G82. Therefore gate G79 applies a "1" signal to gate G70, FIG. 20, inhibiting production of $f_1$ pulses. As previously explained this causes pulse frequency $f_2$ to be greater than pulse frequency $f_1$ and the number in the internal feed adjust register 42 will be decremented toward zero. Until this number is zero $f_2$ pulses will be applied to memory M40 which inhibits gate G78. Therefore, the IFA=0 signal is not present and none of memories M41, M43, M44, or M45 may change state.

When gate G78 does yield an output stating that the number in internal feed adjust register 42 is zero, gate G102 is enabled by the IFA=0 signal and inversion gate G104 to set the right side of memory M45. Gate G107 now senses that memory M45 is set for operation in a positive direction and that PB+ is closed, through inversion gate G108. "OR" gate G86 then inverts the "1" output of gate G107 and applies an enabling "0" signal to gate G82. Gate G82 then applies an enabling "0" signal to gate G70, FIG. 20, through gate G79, FIG. 22, provided that no other changes are taking place in network 59.

Circuits 93 operate in a similar manner which will now be apparent to inhibit and enable gate G70 when the position of switch 98 is changed during operation in the jog mode. "OR" gate G85 receives signals XL or YL from circuits 93 (not shown) associated with axis selector switch terminals XT and YT.

The network of FIG. 22 thus provides a means for preventing any abrupt changes in the axis or direction of movement of a controlled part during operation in the jog mode.

The operation of circuit 97, while not specifically discussed, is apparent from the explanation of FIG. 96. Enabling signals from mode logic network 54 to gates 47, 50 and 56, FIGS. 5 and 7, are derived from memory M41 when the system is in the tape mode. When in the jog mode, sign and axis selection network 59 enables gates 55 and 58, FIGS. 5 and 8.

SERVO SYSTEMS

The pulse outputs as in each of the pulse collectors and coincidence gates 67 are applied to an associate drive system for each axis. Each of the drive systems comprise a prime mover as illustrated in FIG. 2.

The prime movers are each controlled both as to rate of movement and extent of movement by identical servo systems 100, 101, and 102, FIG. 23, which receive as an input the pulse output of an associated one of the pulse collectors and coincidence gates or jog pulses. The inputs to the servo systems are in the form of pulse trains wherein each pulse represents an increment of movement of the lead screw driven by the prime mover, for example, .0002", and the rate by which the pulses are delivered to the servo systems determines the rate at which the prime movers move their associated lead screws. In FIG. 23, each servo system controls operation of an associated prime mover which drives a controlled object with respect to a reference path.

Mechanically coupled to each prime mover or the member driven thereby is a quantizer 100', 101' and 102' which converts movement of the controlled member to discrete feedback pulses, each indicative of an incremental movement. Each feedback pulse represents a unit of movement equal to the unit of movement represented by a command pulse.

Digital servo systems are known in the art. Essentially any digital servo system which moves an object a distance proportional to the number of pulses received thereby at a velocity proportional to the rate of receipt of the command pulses may be used in conjunction with the control system disclosed. Preferred digital servo systems are disclosed in the co-pending applications of Johann F. Reuteler and Edward E. Kirkham, Ser. No. 349,222, and Johann F. Reuteler, Ser. No. 349,216 filed on the same date as this application, and assigned to the same assignee as this application. The disclosures of these co-pending applications are incorporated herein by reference.

Reference is now made to FIG. 24 which in block form exemplifies a preferred digital servo system disclosed in the co-pending applications. The servo system shown in FIG. 24 exemplifies the servo system for each axis. However, only one servo system will herein be disclosed and that will be considered to be the servo system 102 for the Z-axis.

Servo system 102 is a second order or two-loop servo system in which a servo amplifier 103 receives pulse inputs directly without requiring a digital-to-analogue converter. Servo system 102 includes a means for generating discrete feedback pulses $f_q$, each proportional to an incremental distance of movement of a controlled part, here illustrated as bed 7. The pulse generating means comprises an element generally referred to as a quantizer 104 which provides output pulses $f_q$ over a positive or negative output line determined by the direction of movement of the controlled part with respect to its particular axis of movement.

Servo system 102 further comprises a pulse adder 105 which accepts plus or minus $f_q$ pulses from quantizer 104 and plus or minus $f_z$ or jog pulses from OR gates G110 or G111. The pulse output of adder 105 is applied to an error register 106. Error register 106 comprises an eight-stage bi-directional counter and a ninth-stage which determines the algebraic sign of the number held therein. Pulse adder 105 passes $f_z$ or $f_q$ pulses to error register 106 to either increment or decrement error register 106 dependent upon the sign of the pulse. If $f_z$ and $f_q$ pulses occur simultaneously they are algebraically added by pulse adder 105 before being passed to error register 106. The numerical content of error register 106 is sampled every thirty-two clock cycles by a sample logic network 107 controlled by a sample control register 108 which in turn is activated by a $bf_5$ pulse which occurs every thirty-second clock close. Sample logic 107 comprises nine memories which are set every thirty-two clock cycles in accordance with the numerical content and sign of error register 106. Sample control register 108 is in effect a shift pulse generator, as used in shift control 24, having a number of shift stages which sequentially generate shift pulses $sf_1$–$sf_8$ in response to application of a $bf_5$ pulse thereto. The shift, or as hereinafter specified, sample pulses, $sf_1$–$sf_8$ occur every half clock cycle every thirty-second clock cycle. The sampled numerical content of error register 106, which is stored in sample logic network 107 every thirty-second clock cycle are applied to a number-to-frequency converter 109, which produces a pulse frequency $f_p$, having a number of pulses proportional to the sampled numeric content of error register 106. Pulse frequency $f_p$ is immediately applied through a pulse shaper 110 to servo amplifier 103. Pulse frequency $f_p$ is also applied through a sign logic element 111 and hence over a line 111a or 111b dependent upon the algebraic sign of the sampled number to a servo register 112 through a second pulse adder 113. Pulse adder 113 also receives positive or negative $f_q$ pulses from quantizer 104 and functions in the same manner as previously described for pulse adder 105. The pulses $f_p$ and $f_q$ are applied to servo register 112, which is substantially similar to error register 106, to either increment or decrement the number in servo register 112. A second sample logic network 114 is provided to sample the numeric content of servo register 112 under the control of sample control register 108. This numerical content of sample logic network 114 is then applied to number-to-frequency converter 115 which provides an output pulse frequency $f_v$ having a number of pulses proportional to the sampled numerical content of servo register 112. Pulse frequency $f_v$ is then passed to servo amplifier 103 through a pulse shaper 117. The quantizer output pulses $f_q$, both positive and negative, are passed by an OR gate 118 to servo amplifier 103 through a pulse shaper 119. The pulse shapers 110, 117 and 119 receive $f_p$, $f_v$ and $f_q$ pulses, respectively, and shape each pulse into corresponding pulses, all having equal amplitude and pulse widths.

The shaped pulses of pulse frequencies $f_p$, $f_q$, and $f_v$ are applied to servo amplifier 103 and summed therein. The result of this summation determines the direction and magnitude of movement of the prime mover and hence the machine part driven thereby.

It may thus be seen that the objects of the invention set forth as well as those made apparent from the preceding description are efficiently attained. While a preferred embodiment of the invention has been set forth for purposes of disclosure, modifications to the disclosed embodiment of the invention as well as other embodiments thereof may occur to those skilled in the art. Accordingly, the appended claims are intended to cover all embodiments of the invention which do not depart from the spirit and scope of the invention.

What is claimed is:

1. In a system for controlling the movement of a member and adapted to receive instructions for moving the member along a predetermined path with respect to a plurality of non-coincident reference paths where the movement instructions are set forth in numerical form on a storage medium, means for generating a train of rate pulses at a rate indicative of the desired rate of movement of the member, multi-stage counting means arranged to count the pulses of said train, each of the stages of said counting means being arranged to produce a non-carry pulse train at a frequency dependent upon its binary order and carry pulses to the next higher order stage, said counting means comprising first and second sections, the number of stages of said second section being so related to the numerical capacity of the first of said sections that the time of propagation of a carry pulse through said second section to cause overflow of said second section is less than the time required for said first section to count to its capacity, means for preventing further application of carry pulses to said second section upon overflow thereof, means for sensing when both of said sections have overflowed, means responsive to said sensing means for preventing application of the rate pulses to said counting means when both of said sections have overflowed, and means for utilizing the non-carry pulses to move the member.

2. In a system for controlling the movement of a member and adapted to receive instructions for moving the member along a predetermined path with respect to a plurality of non-coincident reference paths where the movement instructions are set forth in numerical form on a storage medium, means for establishing in binary notation an electrical representation of the numerical instructions for movement with respect to each reference path, means for establishing a representation of the longest movement instruction, means for generating a train of rate pulses at a rate indicative of the desired rate of movement of the member, multi-stage counting means arranged to count the pulses of said train, means for providing repetitive uniformly spaced timing pulses, said counting means being arranged to count the rate pulses at a rate determined by the repetition of the timing pulses, each of the stages of said counting means being arranged to produce a non-carry pulse train at a frequency dependent upon its binary order and carry pulses to the next higher order stage, said counting means comprising first and second sections, the number of stages of said second section being so related to the numerical capacity of the first of said sections that the time of propagation of a carry pulse through said second section to cause overflow of said second section is less than the time required for said first section to count to its capacity, means for preventing further application of carry pulses to said second section upon overflow thereof, means for sensing when both of said sections have overflowed, means responsive to said sensing means for preventing application of the rate pulses to said counting means when both of said sections have overflowed, and means for deriving the sums of pulses in selected non-carry pulse trains in accordance with the established binary representation of each instruction for movement, to thereby provide a plurality of sum pulse trains each having a number of pulses proportional to the numerical value of an instruction for moving.

3. In a system for controlling the movement of a member and adapted to receive instructions for moving the member along a predetermined path with respect to a plurality of non-coincident reference paths where the movement instructions are set forth in numerical form on a storage medium, means for establishing in binary notation an electrical representation of the numerical instructions for movement with respect to each reference path, means for establishing a representation of the longest movement instruction, means for generating a train of rate pulses at a rate indicative of the desired rate of movement of the member, multistage counting means arranged to count the pulses of said train, means for providing repetitive uniformly spaced timing pulses, said counting means being arranged to count the rate pulses at a rate determined by the repetition of the timing pulses, each of the stages of said counting means being arranged to produce a non-carry pulse train at a frequency dependent upon its binary order and carry pulses to the next higher order stage, said counting means comprising first and second sections, the number of stages of said second section being so related to the numerical capacity of the first of said sections that the time of propagation of a carry pulse through said second section to cause overflow of said second section is less than the time required for said first section to count to its capacity, means for preventing further application of carry pulses to said second section upon overflow thereof, means for sensing when both of said sections have overflowed, means responsive to said sensing means for preventing application of the rate pulses to said counting means when both of said sections have overflowed, means for deriving the sums of pulses in selected non-carry pulse trains in accordance with the established binary representation of each instruction for movement, to thereby provide a plurality of sum pulse trains each having a number of pulses proportional to the numerical value of an instruction for moving, and means for decreasing the numerical capacity of said counting means by presetting a number of the most significant stages thereof in accordance with the length of the longest movement instruction.

4. In a system for controlling the movement of a member and adapted to receive instructions for moving the member along a predetermined path with respect to a plurality of non-coincident reference paths where the movement instructions are set forth in numerical form on a storage medium, means for establishing in binary notation an electrical representation of the numerical instructions for movement with respect to each reference path, means for establishing a representation of the longest movement instruction, means for generating a train of rate pulses at a rate indicative of the desired rate of movement of the member, multi-stage counting means arranged to count the pulses of said train, each of the stages of said counting means being arranged to produce a non-carry pulse train at a frequency dependent upon its binary order and carry pulses to the next higher order stage, said counting means comprising first and second sections, the number of stages of said second section being so related to the numerical capacity of the first of said sections that the time of propagation of a carry pulse through said second section to cause overflow of said second section is less than the time required for said first section to count to its capacity, means for preventing further application of carry pulses to said second section upon overflow thereof, means for sensing when both of said sections have overflowed, means responsive to said sensing means for preventing application of the rate pulses to said counting means when both of said sections have overflowed, means for deriving the sums of pulses in selected non-carry pulse trains in accordance with the established binary representation of each instruction for movement, to thereby provide a plurality of sum pulse trains each having a number of pulses proportional to the numerical value of an instruction for moving, and means for decreasing the numerical capacity of said counting means by presetting a number of the most significant stages thereof in accordance with the length of the longest movement instruction.

5. A network for generating a multiplicity of frequencies having binary relationship wherein an output pulse is provided for each input pulse comprising a multi-stage binary pulse counting means, and means for applying a series of pulses to said counting means, each of said stages being arranged to produce non-carry output pulses and carry pulses to a succeeding stage, the output pulses of each stage having a binary frequency relation to the output pulses of other stages, said counting means being divided into first and second sections, the overflow pulse from a first of said sections being a carry pulse input to the second of said sections, the number of stages of said second section being so related to the numerical capacity of the first of said sections that the time of propagation of a carry pulse through said second section to cause overflow of said second section is less than the time required for said first section to count to its capacity.

6. The network of claim 5 including means for sensing when both of said sections have overflowed and for halting application of the series of pulses to the counting means in response thereto.

7. The network of claim 5 including means for decreasing the numerical capacity of said counting means to predetermine the number of output frequencies from said counter stages.

8. A network for generating a multiplicity of frequencies having binary relationship wherein an output pulse is provided for each input pulse comprising a multi-stage binary pulse counting means, means for applying a series of pulses to said counting means, each of said stages being arranged to produce non-carry output pulses and carry pulses to a succeeding stage, the output pulses of each stage having a binary frequency relation to the output pulses of other stages, said counting means being divided into first and second sections, the overflow pulse from a first of said section being a carry pulse input to the second of said sections, the number of stages of said second section being so related to the numerical capacity of the first of said sections that the time of propagation of a carry pulse through said second section to cause overflow of said second section is less than the time required for said first section to count to its capacity, and means for preventing application of a carry pulse input to said second section when said second section has overflowed.

9. The network of claim 8 including means for setting a binary notation in the least significant order position of said second section upon application of the series of pulses to said counting means.

10. The network of claim 9 including means for decreasing the numerical capacity of said counting means to predetermine the number of output frequencies from said counter stages.

11. The network of claim 10 wherein said means for decreasing comprises means for determining the number of frequencies desired and setting binary "1" notations in a number of the most significant stage positions of said counting means where the number of stages set equals the total number of stages less the number of frequencies desired.

12. A network for generating a multiplicity of frequencies having binary relationship wherein an output pulse is provided for each input pulse comprising a multistage binary pulse counting means, means for applying a series of pulses to said counting means, each of said stages being arranged to produce non-carry output pulses and carry pulses to a succeeding stage, means for producing repetitive timing pulses at uniformly spaced intervals, said counting means being arranged to count pulses at a rate determined by the repetition of the timing pulses, said counting means being divided into first and second sections, the overflow pulse from a first of said sections being a carry pulse input to the second of said sections, the number of stages of said second section being so related to the numerical capacity of the first of said sections that the time of propagation of a pulse through said second section to cause overflow of said second section is less than the time required for said first section to count to its capacity, and means for sensing when said second section has overflowed and preventing further application of carry pulses from said first section thereto.

13. The network of claim 12 including means for preventing application of the series of pulses to said counting means when both of said sections have overflowed.

14. In a system for controlling the movement of a member and adapted to receive instructions for moving the member along a predetermined path with respect to a plurality of non-coincident reference paths where the movement instructions are set forth in numerical form on a storage medium, means for detecting the magnitude of the longest instruction, means for generating a series of pulses, means for summing said pulses until the summed pulses reach a sum predetermined by the magnitude of the longest instruction, and means for utilizing the summed pulses to move the member.

15. In a system for controlling the movement of a member and adapted to receive instructions for moving the member along a predetermined path with respect to a plurality of non-coincident reference paths wherein the movement instructions are set forth in numerical form on a storage medium; means for detecting the magnitude of the longest instruction, means for generating a series of pulses at a rate indicative of the desired rate of movement of the member, means for summing said pulses until the summed pulses reach a sum predetermined by the magnitude of the longest instruction, and means for utilizing the summed pulses to move the member.

16. In a system of the character described adapted to receive instructions for moving a first member relative to a second member with respect to a plurality of non-coincident reference paths where the movement instructions are set forth in numerical form on a storage medium; means for detecting and storing the instructions, means for detecting the length of the longest stored instruction and establishing a representation indicative of the length thereof, means for generating a series of pulses at a rate indicative of the desired rate of movement of at least one of the members, means for summing said pulses until the summed pulses reach a sum predetermined by the representation indicative of the length of the longest instruction, and means for utilizing the summed pulses.

17. In a system for controlling the movement of a member and adapted to receive instructions for moving the member along a predetermined path with respect to one or more non-coincident reference paths where the movement instructions are set forth in numerical form on a storage medium; means for detecting and storing the instructions, means for detecting the length of the longest stored instruction and for establishing a representation indicative of the length of the longest instruction, means for generating a series of pulses at a rate indicative of the desired rate of movement of the member, means for summing said pulses until the summed pulses reach a sum predetermined by the representation indicative of the length of the longest instruction, and means for utilizing the summed pulses to move the member.

18. In a system for controlling the movement of a member and adapted to receive instructions for moving the member along a predetermined path with respect to two or more non-coincident reference paths where the movement instructions are set forth in binary form on a storage medium; register means for detecting and storing each movement instruction on the medium, means for detecting the length of the longest stored movement instruction and for establishing a representation indicative of the length of the longest movement instruction, means for generating a series of pulses at a rate indicative of the desired rate of movement of the member, means for summing said pulses until the summed pulses reach a sum predetermined by the representation indicative of the length of the longest movement instruction, and means for utilizing the summed pulses to move the member along a path with respect to the reference paths in accordance with the movement instructions.

19. In a system of the character described adapted to receive instructions for moving a first member relative to a second member along a predetermined path with respect to two or more non-coincident reference paths where the instructions are set forth in binary notation on a storage medium; shift registers for receiving and storing each movement instruction in binary form, means for shifting the stored binary instructions in each of said registers until the most significant position of one of said registers receives a binary digit, means for establishing a representation of the number of shifts of the stored binary instructions, means for generating a series of pulses, means for summing said pulses until the summed pulses reach a sum predetermined by the representation of the number of shifts of the stored binary instructions, and means for utilizing the summed pulses for relatively moving the members.

20. In a system of the character described adapted to receive instructions for moving a first member relative to a second member along a predetermined path with respect to two or more non-coincident reference paths where the instructions are set forth in binary notation on a storage medium; shift registers for receiving and storing each movement instruction in binary form, means for shifting the stored binary instructions in each of said registers until the most significant position of one of said registers receives a binary digit, means for establishing a representation of the number of shifts of the stored binary instructions, means for generating a series of pulses, means for summing said pulses until the summed pulses reach a sum predetermined by the representation of the number of shifts of the stored binary instructions, said summing means including means for generating a plurality of pulse trains having binarily related frequencies, the pulses of the trains being non-coincident, and means for selecting said pulse trains in accordance with the binary movement instructions to produce resultant pulse trains having a number of pulses indicative of the extent of movement of the members with respect to the reference paths.

21. In a system of the character described adapted to receive instructions for moving a first member relative to a second member along a predetermined path with respect to two or more non-coincident reference paths at a specified rate where the instructions are set forth in binary notation on a storage medium; shift registers for receiving and storing each movement instruction in binary form, means for shifting the stored binary instructions in each of said registers until the most significant position of one of said registers receives a binary digit, means for establishing a representation of the number of shifts of the stored binary instructions, means for generating a series of pulses at a rate indicative of the desired rate of movement of the members, means for summing said pulses until the summed pulses reach a sum predetermined by the representation of the number of shifts of the stored binary instructions, and means for utilizing the summed pulses.

22. In a system of the character described adapted to receive instructions for moving a first member relative to a second member along a predetermined path with respect to two or more non-concident reference paths at a specified rate where the instructions are set forth in binary notation on a storage medium; shift registers for receiving and storing the instructions in binary form, means for shifting the stored binary instructions in each of said registers until the most significant position of one of said registers receives a binary digit, means for establishing a representation of the number of shifts of the stored binary instructions, means for generating a series of pulses at a rate indicative of the desired rate of movement of the members, means for summing said pulses until the summed pulses reach a sum predetermined by the representation of the number of shifts of the stored binary instructions, and means for utilizing selected summed pulses to move at least one of the members.

23. In a system for controlling the movement of a first member relative to a second member with respect to a plurality of reference paths including means for intermittently feeding input data into the system indicating the successive distances to be moved with respect to the reference paths, means for establishing a representation of the distances to be moved, and means for generating a series of pulses at a rate indicative of the desired rate of movement of the members; the improvement comprising, means for establishing a representation indicative of the length of the longest movement, means for summing the generated pulses until the summed pulses reach a sum predetermined by the representation indicative of the length of the longest movement, and means for utilizing the summed pulses to relatively move the members.

24. In a system for controlling the movement of a first member relative to a second member with respect to a plurality of reference paths including means for intermittently feeding input data into the system indicating the successive distances to be moved with respect to the reference paths, means for establishing a representation of the distances to be moved, and means for generating a series of pulses at a rate indicative of the desired rate of movement of the members; the improvement comprising, means for detecting the length of the longest distance, means for summing the generated pulses until the summed pulses reach a sum predetermined by the length of the longest movement, and means for utilizing the summed pulses to move the members.

25. In a system for simultaneously controlling the movement of a first member relative to a second member with respect to a plurality of reference paths including means for intermittently feeding input data into the system indicating the successive distances to be moved with respect to the reference paths, means for establishing a representation of the distances to be moved and means for generating a series of pulses at a rate indicative of the desired rate of movement of the members; the improvement comprising, means for establishing a representation indicative of the length of the longest movement, means for summing the generated pulses until the summed pulses reach a magnitude pre-determined by the representation indicative of the length of the longest movement, means responsive to said summing means for producing a plurality of pulses proportional to the summed pulses, and means for utilizing the summed pulses to move the members.

26. In a system utilizing electrical pulses for controlling the extent of movement of a member with respect to a plurality of non-coincident reference paths, including means for introducing numerical information into the system signifying the desired movement with respect to the paths, the means being a medium having distance instructions thereon for each path signifying the number of pulses to be utilized in moving the member with respect to the reference paths and a rate instruction signifying the rate of movement; means exclusive of the rate instruction for generating a first series of pulses having a repetition rate proportional to a desired rate of movement of the members, means for establishing in binary form a representation of the rate instruction on the medium, means for repetitively adding the binary rate representation at a rate proportional to the rate of repetition of the first series of pulses to derive a second series of pulses having a repetition rate proportional to the repetition rate of said first series of pulses and the rate instruction, and means for utilizing said second series of pulses to move the member.

27. The system of claim 26 wherein said means for generating a first series of pulses includes means for varying the repetition rate of said first series of pulses, and means dependent upon the previous repetition rate of said first series of pulses for controlling the rate of change of the repetition rate of said first series of pulses.

28. In a system utilizing electrical pulses for controlling the extent of movement of a member with respect to a plurality of non-coincident reference paths, including means for introducing numerical information into the system signifying the desired movement with respect to the paths, the means being a medium having distance instructions thereon for each path signifying the number of pulses to be utilized in moving the member with respect to the reference paths and a rate instruction signifying the rate of movement; means exclusive of the rate instruction for producing a first series of pulses having a repetition rate proportional to a desired rate of movement of the member, means for establishing in binary form a representation of the rate instruction, means for repetitively adding the binary rate representation at a rate proportional to the rate of repetition of said first series of pulses to derive another series of pulses having a repetition rate proportional to the repetition rate of said first series of pulses and the rate instruction, means for varying the repetition rate of said first series of pulses, and means for utilizing said another series of pulses to move the member.

29. The system of claim 28 including means for varying the repetition rate of the first series of pulses.

30. The system of claim 29 including means for producing a numerical representation of the number of pulses in said first series and generating a second series of pulses at a rate proportional to the numerical representation, and means for adding the rate representation at a rate proportional to the repetition rate of said second series of pulses.

31. The system of claim 30 including means for limiting the rate of change of the repetition rate of said second series of pulses when the repetition rate of said first series of pulses is varied.

32. In a system utilizing electrical pulses for controlling the extent of movement of a member with respect to a plurality of non-coincident reference paths, including means for introducing numerical information into the system signifying the desired movement with respect to the paths, the means being a medium having distance instructions thereon for each path signifying the number of pulses to be utilized in moving the member with respect to the reference paths and a rate instruction signifying the rate of movement; means exclusive of the rate instruction for generating a first series of pulses having a repetition rate proportional to a desired rate of movement of the members, means for establishing in binary form a representation of the rate instruction, binary adder means for adding the binary rate representation at a rate proportional to the rate of repetition of said first series of pulses to provide an overflow pulse train from said adder at a rate proportional to the repetition rate of said first series of pulses and the rate instruction, and means for utilizing said second series of pulses to move the member.

33. In a system utilizing electrical pulses for controlling the extent of movement of one or more members with respect to a plurality of non-coincident reference paths, including means for introducing numerical information into the system signifying the desired movement with respect to the paths, the means being a medium having distance instructions thereon for each reference path signifying the number of pulses to be utilized in moving the one or more members with respect to the reference paths and a rate instruction signifying the rate of movement; means for producing a first series of pulses at a rate proportional to a desired rate of movement of the one or more members, bi-directional binary counting means for counting the number of pulses in the first series and producing a second series of pulses at a rate proportional to the number held in said counting means, means for comparing the number of pulses in the first and second series and applying any difference to said counting means until the number of pulses in the second series bears a predetermined relation to the number of pulses in the first series in a predetermined interval of time, means for establishing in binary form a representation of the rate instruction, binary adding means for repetitively adding the binary rate representation at a rate proportional to the rate of repetition of the second series of pulses and detecting the overflow pulses of said adding means to derive a third series of pulses, and means for utilizing the third series of pulses to move the one or more members.

34. The system of claim 33 further including means for controlling the rate of change of the number held in said counter means to control the rate of change of the repetition of the second series of pulses.

35. The system of claim 33 further including means for preventing production of the first series of pulses to cause said counting means to decrement the number in said counting means toward zero and decrease the rate of production of the pulses of the second series.

36. The system of claim 33 further including means for sensing predetermined changes in the operation of said system, and means responsive to said sensing means for preventing production of the first series of pulses to cause said counting means to decrement the number held in said counting means toward zero and decrease the rate of production of the pulses of the second series toward zero.

37. In a system for moving an object including pulse responsive moving means for moving the object a distance proportional to the number of pulses received thereby, the improvement comprising; pulse producing means including selection means adapted to control the number of the produced pulses in a predetermined time dependent upon the setting of said selection means, means responsive to the produced pulses for generating a second number of pulses in a predetermined time which second number is a third order function of the setting of said selection means, and means for applying the series of pulses to the moving means.

38. In a system for moving an object including pulse responsive moving means for moving the object a distance proportional to the number of pulses received thereby, the improvement comprising; selection means, means for producing a number of pulses proportional to the setting of said selection means in a predetermined time, means responsive to the produced pulses for generating a second number of pulses in a predetermined time which number is a third order function of the setting of said selection means, and means for applying the second number of pulses to the moving means.

39. In a system for moving an object including pulse responsive moving means for moving the object a distance proportional to the number of pulses received thereby and at a velocity determined by the rate of receipt of the pulses, the improvement comprising: pulse producing means including selection means adapted to control the number of the produced pulses in a predetermined time dependent upon the setting of said selection means, means responsive to the produced pulses for generating a series of pulses in a predetermined time which number is a third order function of the setting of said selection means, and means for applying the series of pulses to the moving means, said selection means having a multiplicity of settings, the relationship of the repetition rate of the pulses of the series to the settings of said selection means being such that the ratio between succeeding pulse repetition rates decreases as the repetition rate is increased in succeeding settings of said selection means.

40. In a system for moving an object including pulse responsive moving means for moving an object a distance proportional to the number of pulses received thereby and at a velocity determined by the rate of receipt of the pulses, the improvement comprising; pulse producing means including selection means adapted to control the number of the produced pulses in a predetermined time dependent upon the setting of said selection means, means responsive to the produced pulses for generating a series of pulses in a predetermined time which number is a third order function of the setting of said selection means, means for limiting the rate of change of the repetition rate of the pulses of the series with change in the setting of said selection means, and means for applying the series of pulses to the moving means.

41. In a system for moving an object including pulse responsive moving means for moving an object a distance proportional to the number of pulses received thereby and at a velocity determined by the rate of receipt of the pulses, the improvement comprising; pulse producing means including selection means having a multiplicity of settings and adapted to control the number of the produced pulses in a predetermined time dependent upon the setting of said selection means, said pulse producing means being effective to produce a series of pulses in a predetermined interval of time for each setting of said selection means, the number of pulses in each succeeding series in relation to succeeding settings of said selection means being such that the ratio between the number of pulses in succeeding series decreases as the number of pulses in succeeding series increases.

42. The system of claim 41 further including means for limiting the rate of change in the number of pulses produced when the setting of said selection means is changed.

43. In a system for moving one or more objects with respect to a plurality of non-coincident reference paths including pulse responsive means for moving each object along one reference path a distance proportional to the number of pulses received thereby; pulse producing means including first selection means adapted to control the number of pulses produced in a predetermined time dependent on the setting of said selection means, second manual selection means for selecting the pulse responsive means to which the pulses are directed, third manual selection means for selecting the direction of travel of an object along a desired path of travel, and the pulse distributing means responsive to said third selection means for directing pulses to a selected one of the pulse responsive means.

44. In a system for moving one or more objects with respect to a plurality of non-coincident reference paths including pulse responsive means for moving each object along one reference path a distance proportional to the number of pulses received thereby; means for producing a series of pulses in a predetermined time, first manual selection means for selecting the pulse responsive means to which the pulses are directed, second manual selection means for selecting the direction of travel of an object along a desired path of travel, pulse distributing means responsive to said second selection means for directing pulses to a selected one of the pulse responsive means, and means responsive to motion of the object for detecting when the object has reached a predetermined position in a selected direction of travel and inhibiting production of pulses.

45. In a system for moving one or more objects with respect to a plurality of non-coincident reference paths including pulse responsive means for moving each object along one reference path a distance proportional to the number of pulses received thereby; means for producing a series of pulses, first manual selection means for selecting the pulse responsive means to which the pulses are directed, second manual selection means for selecting the direction of travel of an object along a desired path of travel, pulse distributing means responsive to said second selection means for directing pulses to a selected one of the pulse responsive means, and means for detecting a change in said first selection means and inhibiting production of pulses.

46. In a system for moving one or more objects with respect to a plurality of non-coincident reference paths including pulse responsive means for moving each object along one reference path a distance proportional to the number of pulses received thereby; means for producing a series of pulses, manual selection means for selecting the pulse responsive means to which the pulses are directed and the direction of travel of an object along a desired path of travel, pulse distributing means responsive to said selection means for directing pulses to a selected one of the pulse responsive means, and means for detecting a change in said selection means and inhibiting production of pulses.

47. In a system for moving one or more objects with respect to a plurality of non-coincident reference paths including pulse responsive means for moving each object along one reference path a distance proportional to the number of pulses received thereby; means for producing a series of pulses, manual selection means for selecting the pulse responsive means to which the pulses are directed and selecting the direction of travel of an object along a desired path of travel, pulse distributing means responsive to said selection means for directing pulses to a selected one of the pulse responsive means, and means responsive to movement of a selected object for detecting when the object has reached a predetermined position in a selected direction of travel and inhibiting production of pulses.

48. In a numerical control system utilizing electrical pulses for controlling the extent of movement of a member with respect to a plurality of non-coincident reference paths, including means for introducing numerical information into the system signifying the desired movement with respect to the paths, the means being a record medium having instructions thereon for each path and a rate instruction signifying the rate of movement; means exclusive of the rate instructions for generating a first series of pulses having a repetition rate proportional to a desired rate of movement of the members, means for establishing in binary form a representation of the rate instruction, binary adder means for adding the binary rate representation at a rate proportional to the rate of repetition of said first series of pulses to provide an overflow pulse train from said adder at a rate proportional to the repetition rate of said first series of pulses and the rate instructions.

49. A numerical control system for generating pulses at a repetition rate proportional to a desired rate of movement of one or more members, comprising means for establishing a numerical representation of a number indicating a feedrate for the one or more movable members, means for generating a first pulse frequency proportional to a desired percent of the feedrate and selection means for changing said first pulse frequency, means for multiplying said numerical representation by said first pulse frequency to produce a second pulse frequency, means for moving said one or more members at a rate proportional to said second pulse frequency, and means responsive to said means for generating said first pulse frequency for limiting the rate of change thereof and thereby control the rate of change of said second pulse frequency.

50. A system utilizing electrical pulses for controlling the movement of one or more members with respect to a plurality of non-coincident reference paths, including means for introducing numerical information into the system signifying desired movements of the one or more members with respect to the paths, said numerical information including a rate instruction signifying the rate of movement of the one or more members, comprising means for producing a first series of pulses at a rate proportional to a desired rate of movement of said one or more members, counting means for counting the number of pulses in the first series and producing a second series of pulses at a rate proportional to the number in said counting means, means for comparing the number of pulses in the first and second series and applying any difference to said counting means until the number of pulses in the second series bears a predetermined relation to the number of pulses in the first series in a predetermined interval of time, means for establishing in numerical form a representation of the rate instruction, means for multiplying said numerical representations by said second series of pulses to derive a third series of pulses, and means for utilizing the third series of pulses to control the rate of movement of the one or more members.

51. The system of claim 50, further including means for controlling the rate of change of the numbers in said counting means to control the rate of change of the frequency of the third series of pulses.

52. The system of claim 50, further including means for preventing production of the first series of pulses to cause said counting means to decrement the number in said counting means toward zero and decrease the rate of production of pulses in the second series.

53. The system of claim 49, further including means for sensing predetermined changes in the operation of said system, and means responsive to said sensing means for preventing production of the first series of pulses to cause said counting means to decrement the number held in said counting means toward zero and decrease the rate of production of the pulses of the second series toward zero.

References Cited

UNITED STATES PATENTS

| | | | |
|---|---|---|---|
| 3,069,608 | 12/1962 | Forrester et al. | 318—162 |
| 3,246,125 | 4/1966 | Mergler | 318—162 X |
| 3,278,817 | 10/1966 | Johnson et al. | 318—18 |

BENJAMIN DOBECK, *Primary Examiner.*

U.S. Cl. X.R.

235—151.11; 318—28, 162